(12) United States Patent
Goodwin et al.

(10) Patent No.: US 7,774,955 B2
(45) Date of Patent: *Aug. 17, 2010

(54) ARTICLE OF FOOTWEAR WITH A SOLE STRUCTURE HAVING FLUID-FILLED SUPPORT ELEMENTS

(75) Inventors: David A. Goodwin, Portland, OR (US); Gerald Edwin Crowley, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/425,437

(22) Filed: Apr. 17, 2009

(65) Prior Publication Data
US 2009/0199431 A1   Aug. 13, 2009

Related U.S. Application Data

(63) Continuation of application No. 11/242,607, filed on Oct. 3, 2005, now Pat. No. 7,533,477.

(51) Int. Cl.
*A43B 13/20* (2006.01)
(52) U.S. Cl. .............................. 36/29; 36/28; 36/35 B; 36/37
(58) Field of Classification Search ............... 36/28, 36/29, 35 R, 35 B, 37
See application file for complete search history.

(56) References Cited
U.S. PATENT DOCUMENTS

| 507,490 A | 10/1893 | Gambino |
|---|---|---|
| 607,086 A | 7/1898 | Safford |
| 622,673 A | 4/1899 | Ferrata |
| 900,867 A | 10/1908 | Miller |
| 933,422 A | 7/1909 | Dee |
| 949,754 A | 2/1910 | Busky |
| 1,069,001 A | 7/1913 | Guy |
| 1,094,211 A | 4/1914 | Jenoi et al. |
| 1,099,180 A | 6/1914 | Karacsonyi |
| 1,102,343 A | 7/1914 | Kovacs |
| 1,240,153 A | 9/1917 | Olsen |
| 1,272,490 A | 7/1918 | Matear |
| 1,278,320 A | 9/1918 | Ellithorpe |

(Continued)

FOREIGN PATENT DOCUMENTS

AT   181938   2/1906

(Continued)

OTHER PUBLICATIONS

Sports Research Review, NIKE, Inc., Jan./Feb. 1990.

(Continued)

*Primary Examiner*—Marie Patterson
(74) *Attorney, Agent, or Firm*—Banner & Witcoff, Ltd.

(57) ABSTRACT

An article of footwear is disclosed that includes an upper and a sole structure secured to the upper. The sole structure incorporates a support element that includes a fluid-filled chamber, a first insert, and a second insert. The chamber defines a first surface, an opposite second surface, and a sidewall extending between the first surface and the second surface. The first insert is secured to the first surface and at least partially recessed into the polymer material of the chamber, and the second insert is secured to the second surface. In addition, the chamber may be pressurized to deform the first insert or the second insert.

15 Claims, 19 Drawing Sheets

U.S. PATENT DOCUMENTS

| | | |
|---|---|---|
| 1,304,915 A | 5/1919 | Spinney |
| 1,323,610 A | 12/1919 | Price |
| 1,338,817 A | 5/1920 | DeLuca |
| 1,502,087 A | 7/1924 | Bunns |
| 1,514,468 A | 11/1924 | Schopf |
| 1,584,034 A | 5/1926 | Klotz |
| 1,625,582 A | 4/1927 | Anderson |
| 1,625,810 A | 4/1927 | Krichbaum |
| 1,670,747 A | 5/1928 | Sestito |
| 1,869,257 A | 7/1932 | Hitzler |
| 1,870,065 A | 8/1932 | Nusser |
| 1,870,114 A | 8/1932 | Heller |
| 1,916,483 A | 7/1933 | Krichbaum |
| 1,970,803 A | 8/1934 | Johnson |
| 2,004,906 A | 6/1935 | Simister |
| 2,080,469 A | 5/1937 | Gilbert |
| 2,086,389 A | 7/1937 | Pearson |
| 2,104,924 A | 1/1938 | Dellea |
| 2,122,108 A | 6/1938 | Modlin |
| 2,198,228 A | 4/1940 | Pinaud et al. |
| 2,269,342 A | 1/1942 | Johnson |
| 2,299,009 A | 10/1942 | Denk |
| 2,365,807 A | 12/1944 | Dialynas |
| 2,437,227 A | 3/1948 | Hall |
| 2,488,382 A | 11/1949 | Davis |
| 2,546,827 A | 3/1951 | Lavinthal |
| 2,600,239 A | 6/1952 | Gilbert |
| 2,645,865 A | 7/1953 | Town |
| 2,677,906 A | 5/1954 | Reed |
| 2,703,770 A | 3/1955 | Melzer |
| 2,710,460 A | 6/1955 | Stasinos |
| 2,721,400 A | 10/1955 | Israel |
| 2,748,401 A | 6/1956 | Winstead |
| 2,762,134 A | 9/1956 | Town |
| 3,030,640 A | 4/1962 | Gosman |
| 3,041,746 A | 7/1962 | Rakus |
| 3,048,514 A | 8/1962 | Bentele et al. |
| 3,120,712 A | 2/1964 | Menken |
| 3,121,430 A | 2/1964 | O'Reilly |
| 3,160,963 A | 12/1964 | Helmert |
| 3,204,678 A | 9/1965 | Worcester |
| 3,251,076 A | 5/1966 | Burke |
| 3,284,264 A | 11/1966 | O'Rourke |
| 3,335,045 A | 8/1967 | Post |
| 3,366,525 A | 1/1968 | Jackson |
| 3,429,545 A | 2/1969 | Michel |
| 3,469,576 A | 9/1969 | Smith et al. |
| 3,568,227 A | 3/1971 | Dunham |
| 3,589,037 A | 6/1971 | Gallagher |
| 3,608,215 A | 9/1971 | Fukuoka |
| 3,685,176 A | 8/1972 | Rudy |
| 3,758,964 A | 9/1973 | Nishimura |
| 3,765,422 A | 10/1973 | Smith |
| 3,822,490 A | 7/1974 | Murawski |
| 4,000,566 A | 1/1977 | Famolare, Jr. |
| 4,017,931 A | 4/1977 | Golden |
| 4,030,213 A | 6/1977 | Daswick |
| 4,054,960 A | 10/1977 | Pettit et al. |
| 4,074,446 A | 2/1978 | Eisenberg |
| 4,115,934 A | 9/1978 | Hall |
| 4,123,855 A | 11/1978 | Thedford |
| 4,129,951 A | 12/1978 | Petrosky |
| 4,167,795 A | 9/1979 | Lambert, Jr. |
| 4,183,156 A | 1/1980 | Rudy |
| 4,187,620 A | 2/1980 | Seiner |
| 4,217,705 A | 8/1980 | Donzis |
| 4,219,945 A | 9/1980 | Rudy |
| 4,223,457 A | 9/1980 | Borgeas |
| 4,237,625 A | 12/1980 | Cole et al. |
| 4,241,523 A | 12/1980 | Daswick |
| 4,262,433 A | 4/1981 | Hagg et al. |
| 4,267,648 A | 5/1981 | Weisz |
| 4,271,606 A | 6/1981 | Rudy |
| 4,271,607 A | 6/1981 | Funck |
| 4,287,250 A | 9/1981 | Rudy |
| 4,292,702 A | 10/1981 | Phillips |
| 4,297,797 A | 11/1981 | Meyers |
| 4,305,212 A | 12/1981 | Coomer |
| 4,314,413 A | 2/1982 | Dassler |
| 4,319,412 A | 3/1982 | Muller et al. |
| 4,328,599 A | 5/1982 | Mollura |
| 4,342,158 A | 8/1982 | McMahon et al. |
| 4,358,902 A | 11/1982 | Cole et al. |
| 4,364,188 A | 12/1982 | Turner |
| 4,399,621 A | 8/1983 | Dassler |
| 4,431,003 A | 2/1984 | Sztancsik |
| 4,439,936 A | 4/1984 | Clarke et al. |
| 4,446,634 A | 5/1984 | Johnson et al. |
| 4,458,430 A | 7/1984 | Peterson |
| 4,483,030 A | 11/1984 | Plick et al. |
| 4,486,964 A | 12/1984 | Rudy |
| 4,492,046 A | 1/1985 | Kosova |
| 4,494,321 A | 1/1985 | Lawlor |
| 4,506,460 A | 3/1985 | Rudy |
| 4,521,979 A | 6/1985 | Blaser |
| 4,535,553 A | 8/1985 | Derderian |
| 4,536,974 A | 8/1985 | Cohen |
| 4,546,555 A | 10/1985 | Spademan |
| 4,547,919 A | 10/1985 | Wang |
| 4,559,366 A | 12/1985 | Hostettler |
| 4,566,206 A | 1/1986 | Weber |
| 4,592,153 A | 6/1986 | Jacinto |
| 4,594,799 A | 6/1986 | Lin |
| 4,598,484 A | 7/1986 | Ma |
| 4,598,487 A | 7/1986 | Misevich |
| 4,610,099 A | 9/1986 | Signori |
| 4,616,431 A | 10/1986 | Dassler |
| 4,624,062 A | 11/1986 | Autry |
| 4,638,575 A | 1/1987 | Illustrato |
| 4,638,577 A | 1/1987 | Riggs |
| 4,660,299 A | 4/1987 | Omilusik |
| 4,662,087 A | 5/1987 | Beuch |
| 4,670,995 A | 6/1987 | Huang |
| 4,680,875 A | 7/1987 | Danieli |
| 4,680,876 A | 7/1987 | Peng |
| 4,686,130 A | 8/1987 | Kon |
| 4,709,489 A | 12/1987 | Welter |
| 4,715,130 A | 12/1987 | Scatena |
| 4,722,131 A | 2/1988 | Huang |
| 4,731,939 A | 3/1988 | Parracho et al. |
| 4,733,483 A | 3/1988 | Lin |
| 4,744,157 A | 5/1988 | Dubner |
| 4,746,555 A | 5/1988 | Luckanuck |
| 4,753,021 A | 6/1988 | Cohen |
| 4,774,774 A | 10/1988 | Allen, Jr. |
| 4,779,359 A | 10/1988 | Famolare, Jr. |
| D298,583 S | 11/1988 | Yung-Mao |
| 4,782,602 A | 11/1988 | Lakic |
| 4,794,707 A | 1/1989 | Franklin et al. |
| 4,798,009 A | 1/1989 | Colonel et al. |
| 4,802,289 A | 2/1989 | Guldager |
| 4,803,029 A | 2/1989 | Iversen et al. |
| 4,815,221 A | 3/1989 | Diaz |
| 4,817,304 A | 4/1989 | Parker et al. |
| 4,823,482 A | 4/1989 | Lakic |
| 4,843,737 A | 7/1989 | Vorderer |
| 4,843,741 A | 7/1989 | Yung-Mao |
| 4,845,338 A | 7/1989 | Lakic |
| 4,845,861 A | 7/1989 | Moumgdgian |
| 4,845,863 A | 7/1989 | Yung-Mao |
| 4,864,738 A | 9/1989 | Horovitz et al. |
| 4,874,640 A | 10/1989 | Donzis |
| 4,878,300 A | 11/1989 | Bogaty |
| 4,881,328 A | 11/1989 | Yung-Mao |

| | | |
|---|---|---|
| 4,881,329 A | 11/1989 | Crowley |
| 4,887,367 A | 12/1989 | Mackness et al. |
| 4,891,855 A | 1/1990 | Cheng-Chung |
| 4,905,382 A | 3/1990 | Yung-Mao |
| 4,906,502 A | 3/1990 | Rudy |
| 4,908,962 A | 3/1990 | Yung-Mao |
| 4,910,884 A | 3/1990 | Lindh et al. |
| 4,912,861 A | 4/1990 | Huang |
| 4,918,838 A | 4/1990 | Chang |
| 4,936,029 A | 6/1990 | Rudy |
| 4,956,927 A | 9/1990 | Misevich et al. |
| 4,965,899 A | 10/1990 | Sekido et al. |
| 4,972,611 A | 11/1990 | Swartz et al. |
| 4,984,376 A | 1/1991 | Walter et al. |
| 4,991,317 A | 2/1991 | Lakic |
| D315,634 S | 3/1991 | Yung-Mao |
| 4,999,931 A | 3/1991 | Vermeulen |
| 4,999,932 A | 3/1991 | Grim |
| 5,005,299 A | 4/1991 | Whatley |
| 5,005,300 A | 4/1991 | Diaz et al. |
| 5,014,449 A | 5/1991 | Richard et al. |
| 5,022,109 A | 6/1991 | Pekar |
| 5,025,575 A | 6/1991 | Lakic |
| 5,042,176 A | 8/1991 | Rudy |
| 5,044,030 A | 9/1991 | Balaton |
| 5,046,267 A | 9/1991 | Kilgore et al. |
| 5,060,401 A | 10/1991 | Whatley |
| 5,068,981 A | 12/1991 | Jung |
| 5,083,361 A | 1/1992 | Rudy |
| 5,092,060 A | 3/1992 | Frachey et al. |
| 5,104,477 A | 4/1992 | Williams et al. |
| 5,138,776 A | 8/1992 | Levin |
| 5,155,927 A | 10/1992 | Bates et al. |
| 5,158,767 A | 10/1992 | Cohen et al. |
| 5,179,792 A | 1/1993 | Brantingham |
| 5,193,246 A | 3/1993 | Huang |
| 5,195,257 A | 3/1993 | Holcomb et al. |
| 5,199,191 A | 4/1993 | Moumdjian |
| 5,222,312 A | 6/1993 | Doyle |
| 5,224,277 A | 7/1993 | Sang Do |
| 5,224,278 A | 7/1993 | Jeon |
| 5,228,156 A | 7/1993 | Wang |
| 5,233,767 A | 8/1993 | Kramer |
| 5,235,715 A | 8/1993 | Donzis |
| 5,238,231 A | 8/1993 | Huang |
| 5,245,766 A | 9/1993 | Warren |
| 5,253,435 A | 10/1993 | Auger et al. |
| 5,257,470 A | 11/1993 | Auger et al. |
| 5,279,051 A | 1/1994 | Whatley |
| 5,297,349 A | 3/1994 | Kilgore |
| 5,335,382 A | 8/1994 | Huang |
| 5,337,492 A | 8/1994 | Anderie et al. |
| 5,343,639 A | 9/1994 | Kilgore et al. |
| 5,353,459 A | 10/1994 | Potter et al. |
| 5,353,523 A | 10/1994 | Kilgore et al. |
| 5,355,552 A | 10/1994 | Huang |
| 5,363,570 A | 11/1994 | Allen et al. |
| 5,367,791 A | 11/1994 | Gross et al. |
| 5,406,719 A | 4/1995 | Potter |
| 5,425,184 A | 6/1995 | Lyden et al. |
| 5,440,826 A | 8/1995 | Whatley |
| 5,493,792 A | 2/1996 | Bates et al. |
| 5,543,194 A | 8/1996 | Rudy |
| 5,558,395 A | 9/1996 | Huang |
| 5,572,804 A | 11/1996 | Skaja et al. |
| 5,595,004 A | 1/1997 | Lyden et al. |
| 5,598,645 A | 2/1997 | Kaiser et al. |
| 5,625,964 A | 5/1997 | Lyden et al. |
| 5,669,161 A | 9/1997 | Huang |
| 5,685,090 A | 11/1997 | Tawney et al. |
| 5,686,167 A | 11/1997 | Rudy |
| 5,713,141 A | 2/1998 | Mitchell et al. |
| 5,741,568 A | 4/1998 | Rudy |
| 5,753,061 A | 5/1998 | Rudy |
| 5,755,001 A | 5/1998 | Potter et al. |
| 5,771,606 A | 6/1998 | Litchfield et al. |
| 5,782,014 A | 7/1998 | Peterson |
| 5,802,739 A | 9/1998 | Potter et al. |
| 5,830,553 A | 11/1998 | Huang |
| 5,832,630 A | 11/1998 | Potter |
| 5,846,063 A | 12/1998 | Lakic |
| 5,853,844 A | 12/1998 | Wen |
| 5,902,660 A | 5/1999 | Huang |
| 5,907,911 A | 6/1999 | Huang |
| 5,916,664 A | 6/1999 | Rudy |
| 5,925,306 A | 7/1999 | Huang |
| 5,930,918 A | 8/1999 | Healy et al. |
| 5,937,462 A | 8/1999 | Huang |
| 5,952,065 A | 9/1999 | Mitchell et al. |
| 5,976,451 A | 11/1999 | Skaja et al. |
| 5,979,078 A | 11/1999 | McLaughlin |
| 5,987,780 A | 11/1999 | Lyden et al. |
| 5,993,585 A | 11/1999 | Goodwin et al. |
| 6,009,637 A | 1/2000 | Pavone |
| 6,013,340 A | 1/2000 | Bonk et al. |
| 6,018,889 A | 2/2000 | Friton |
| 6,027,683 A | 2/2000 | Huang |
| 6,029,962 A | 2/2000 | Shorten et al. |
| 6,055,746 A | 5/2000 | Lyden et al. |
| 6,055,747 A | 5/2000 | Lombardino |
| 6,065,150 A | 5/2000 | Huang |
| 6,098,313 A | 8/2000 | Skaja |
| 6,115,944 A | 9/2000 | Lain |
| 6,119,371 A | 9/2000 | Goodwin et al. |
| 6,127,010 A | 10/2000 | Rudy |
| 6,128,837 A | 10/2000 | Huang |
| 6,131,310 A | 10/2000 | Fang |
| D433,216 S | 11/2000 | Avar et al. |
| 6,158,149 A | 12/2000 | Rudy |
| 6,192,606 B1 | 2/2001 | Pavone |
| 6,233,846 B1 | 5/2001 | Sordi |
| 6,253,466 B1 | 7/2001 | Harmon-Weiss et al. |
| 6,266,897 B1 | 7/2001 | Seydel et al. |
| 6,305,100 B1 | 10/2001 | Komarnycky et al. |
| 6,374,514 B1 | 4/2002 | Swigart |
| 6,457,261 B1 | 10/2002 | Crary |
| 6,487,796 B1 | 12/2002 | Avar et al. |
| 6,516,540 B2 | 2/2003 | Seydel et al. |
| 6,598,320 B2 | 7/2003 | Turner et al. |
| 6,665,958 B2 | 12/2003 | Goodwin |
| 6,783,184 B2 | 8/2004 | DiBattista et al. |
| 6,851,204 B2 | 2/2005 | Aveni et al. |
| 6,880,267 B2 | 4/2005 | Smaldone et al. |
| 6,918,198 B2 | 7/2005 | Chi |
| 6,964,120 B2 | 11/2005 | Cartier et al. |
| 6,968,636 B2 | 11/2005 | Aveni et al. |
| 7,082,698 B2 | 8/2006 | Smaldone et al. |
| 7,533,477 B2 * | 5/2009 | Goodwin et al. ............... 36/29 |
| 2001/0042321 A1 | 11/2001 | Tawney et al. |
| 2003/0051373 A1 | 3/2003 | Goodwin |
| 2004/0068892 A1 | 4/2004 | Wang |
| 2004/0123494 A1 | 7/2004 | Goodwin |
| 2004/0128860 A1 | 7/2004 | Smaldone et al. |
| 2004/0181969 A1 | 9/2004 | Smaldone et al. |
| 2004/0261292 A1 | 12/2004 | Aveni et al. |
| 2005/0028403 A1 | 2/2005 | Swigart et al. |
| 2005/0132607 A1 | 6/2005 | Dojan et al. |
| 2005/0132608 A1 | 6/2005 | Dojan et al. |
| 2005/0132609 A1 | 6/2005 | Dojan et al. |
| 2005/0132610 A1 | 6/2005 | Foxen et al. |
| 2006/0096125 A1 | 5/2006 | Yen |
| 2006/0112592 A1 | 6/2006 | Leedy et al. |
| 2007/0033831 A1 | 2/2007 | Aveni |

| | | | | | |
|---|---|---|---|---|---|
| 2007/0074423 A1 * | 4/2007 | Goodwin et al. ............... 36/29 | GB | 978654 | 12/1964 |
| | | | GB | 1128764 | 10/1968 |
| FOREIGN PATENT DOCUMENTS | | | JP | 266718 | 9/1992 |
| | | | JP | 6-181802 | 7/1994 |
| AT | 200963 | 12/1958 | RO | 75100322 | 1/1975 |
| CA | 727582 | 2/1966 | RO | 54221 | 6/1978 |
| DE | 32 34 086 | 9/1982 | WO | WO89/10074 | 11/1989 |
| DE | 92 01 758.4 | 12/1992 | WO | WO90/10396 | 9/1990 |
| EP | 0 094 868 | 5/1983 | WO | WO91/11928 | 8/1991 |
| EP | 0 215 974 A1 | 9/1985 | WO | WO91/11931 | 8/1991 |
| EP | 0456434 | 11/1991 | WO | WO92/08384 | 5/1992 |
| EP | 0 605 482 B1 | 9/1992 | WO | WO95/20332 | 8/1995 |
| EP | 0 893 074 | 1/1999 | WO | WO 99/22160 | 5/1999 |
| FR | 1195549 | 11/1959 | WO | WO 01/70061 | 9/2001 |
| FR | 1406610 | 11/1965 | WO | WO 01/70063 | 9/2001 |
| FR | 2144464 | 1/1973 | WO | WO 2005/016051 | 2/2005 |
| FR | 2404413 | 4/1979 | | | |
| FR | 2407008 | 5/1979 | | | |
| FR | 2483321 | 4/1981 | | | |
| FR | 2614510 | 4/1987 | | | |
| FR | 2.639537 | 11/1988 | | | |
| GB | 14955 | 8/1893 | | | |
| GB | 7441 | 3/1906 | | | |
| GB | 233387 | 1/1924 | | | |

OTHER PUBLICATIONS

Brooks Running Catalog, Fall 1991.
Invitation to Pay Additional Fees and Partial International Search Report dated Feb. 29, 2008 of Application No. PCT/US2006/038052.
US 4,974,345, 12/1990, Yung-Mao (withdrawn)

* cited by examiner

ARTICLE OF FOOTWEAR WITH A SOLE STRUCTURE HAVING FLUID-FILLED SUPPORT ELEMENTS

STATEMENT OF RELATED APPLICATION

This non-provisional U.S. patent application is a continuation application and claims priority to U.S. patent application Ser. No. 11/242,607 which was filed in the U.S. Patent and Trademark Office on Oct. 3, 2005, and entitled Article Of Footwear With A Sole Structure Having Fluid-Filled Support Elements, now allowed, such prior application being entirely incorporated herein by reference.

BACKGROUND

A conventional article of athletic footwear includes two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and the ground to attenuate ground reaction forces. The sole structure may also provide traction and control foot motions, such as over pronation. Accordingly, the upper and the sole structure operate cooperatively to provide a comfortable structure that is suited for a wide variety of ambulatory activities, such as walking and running.

The sole structure of athletic footwear generally exhibits a layered configuration that includes a comfort-enhancing insole, a resilient midsole formed from a polymer foam, and a ground-contacting outsole that provides both abrasion-resistance and traction. Suitable polymer foam materials for the midsole include ethylvinylacetate or polyurethane that compress resiliently under an applied load to attenuate ground reaction forces and absorb energy. Conventional polymer foam materials are resiliently compressible, in part, due to the inclusion of a plurality of open or closed cells that define an inner volume substantially displaced by gas. That is, the polymer foam includes a plurality of bubbles that enclose the gas. Following repeated compressions, the cell structure may deteriorate, thereby resulting in decreased compressibility of the foam. Accordingly, the force attenuation characteristics of the midsole may decrease over the lifespan of the footwear.

One manner of reducing the weight of a polymer foam midsole and decreasing the effects of deterioration following repeated compressions is disclosed in U.S. Pat. No. 4,183,156 to Rudy, hereby incorporated by reference, in which cushioning is provided by a fluid-filled bladder formed of an elastomeric materials. The bladder includes a plurality of tubular chambers that extend longitudinally along a length of the sole structure. The chambers are in fluid communication with each other and jointly extend across the width of the footwear. The bladder may be encapsulated in a polymer foam material, as disclosed in U.S. Pat. No. 4,219,945 to Rudy, hereby incorporated by reference. The combination of the bladder and the encapsulating polymer foam material functions as a midsole. Accordingly, the upper is attached to the upper surface of the polymer foam material and an outsole or tread member is affixed to the lower surface.

Bladders of the type discussed above are generally formed of an elastomeric material and are structured to have upper and lower portions that enclose one or more chambers therebetween. The chambers are pressurized above ambient pressure by inserting a nozzle or needle connected to a fluid pressure source into a fill inlet formed in the bladder. Following pressurization of the chambers, the fill inlet is sealed and the nozzle is removed.

Fluid-filled bladders suitable for footwear applications may be manufactured by a two-film technique, in which two separate sheets of elastomeric film are formed to exhibit the overall peripheral shape of the bladder. The sheets are then bonded together along their respective peripheries to form a sealed structure, and the sheets are also bonded together at predetermined interior areas to give the bladder a desired configuration. That is, the interior bonds provide the bladder with chambers having a predetermined shape and size. Such bladders have also been manufactured by a blow-molding technique, wherein a molten or otherwise softened elastomeric material in the shape of a tube is placed in a mold having the desired overall shape and configuration of the bladder. The mold has an opening at one location through which pressurized air is provided. The pressurized air induces the liquefied elastomeric material to conform to the shape of the inner surfaces of the mold. The elastomeric material then cools, thereby forming a bladder with the desired shape and configuration.

SUMMARY

One aspect of the invention is an article of footwear having an upper and a sole structure secured to the upper. The sole structure incorporates a support element that includes a fluid-filled chamber, a first insert, and a second insert. The chamber defines a first surface, an opposite second surface, and a sidewall extending between the first surface and the second surface. The first insert is secured to the first surface and at least partially recessed into the polymer material of the chamber. The second insert is secured to the second surface.

The chamber may have a cylindrical configuration such that the first insert is recessed into an end of the cylindrical configuration. The second insert may also be at least partially recessed into the polymer material of the chamber. In some embodiments, the chamber is devoid of internal connections that join the first surface and the second surface. In addition, the chamber may be pressurized to deform at least one of the first insert and the second insert.

Another aspect of the invention is a method of manufacturing a fluid-filled element. The method may include a step of forming a chamber from a polymer material. An insert may be secured to a surface of the chamber. The chamber is then pressurized to deform the insert.

The advantages and features of novelty characterizing various aspects of the invention are pointed out with particularity in the appended claims. To gain an improved understanding of the advantages and features of novelty, however, reference may be made to the following descriptive matter and accompanying drawings that describe and illustrate various embodiments and concepts related to the aspects of the invention.

DESCRIPTION OF THE DRAWINGS

The foregoing Summary, as well as the following Detailed Description, will be better understood when read in conjunction with the accompanying drawings.

DETAILED DESCRIPTION

Introduction

The following discussion and accompanying figures disclose an article of footwear having support elements in accordance with aspects of the present invention. Concepts related to the support elements are disclosed with reference to footwear having a configuration suitable for the sport of running. The support elements are not solely limited to footwear designed for running, however, and may be incorporated into a wide range of athletic footwear styles, including shoes that are suitable for baseball, basketball, football, rugby, soccer, tennis, volleyball, and walking, for example. In addition, the support elements may be incorporated into footwear that is generally considered to be non-athletic, including a variety of dress shoes, casual shoes, sandals, and boots. An individual skilled in the relevant art will appreciate, therefore, that the concepts disclosed herein with regard to the support elements apply to a wide variety of footwear styles, in addition to the specific style discussed in the following material and depicted in the accompanying figures.

Figure 1:
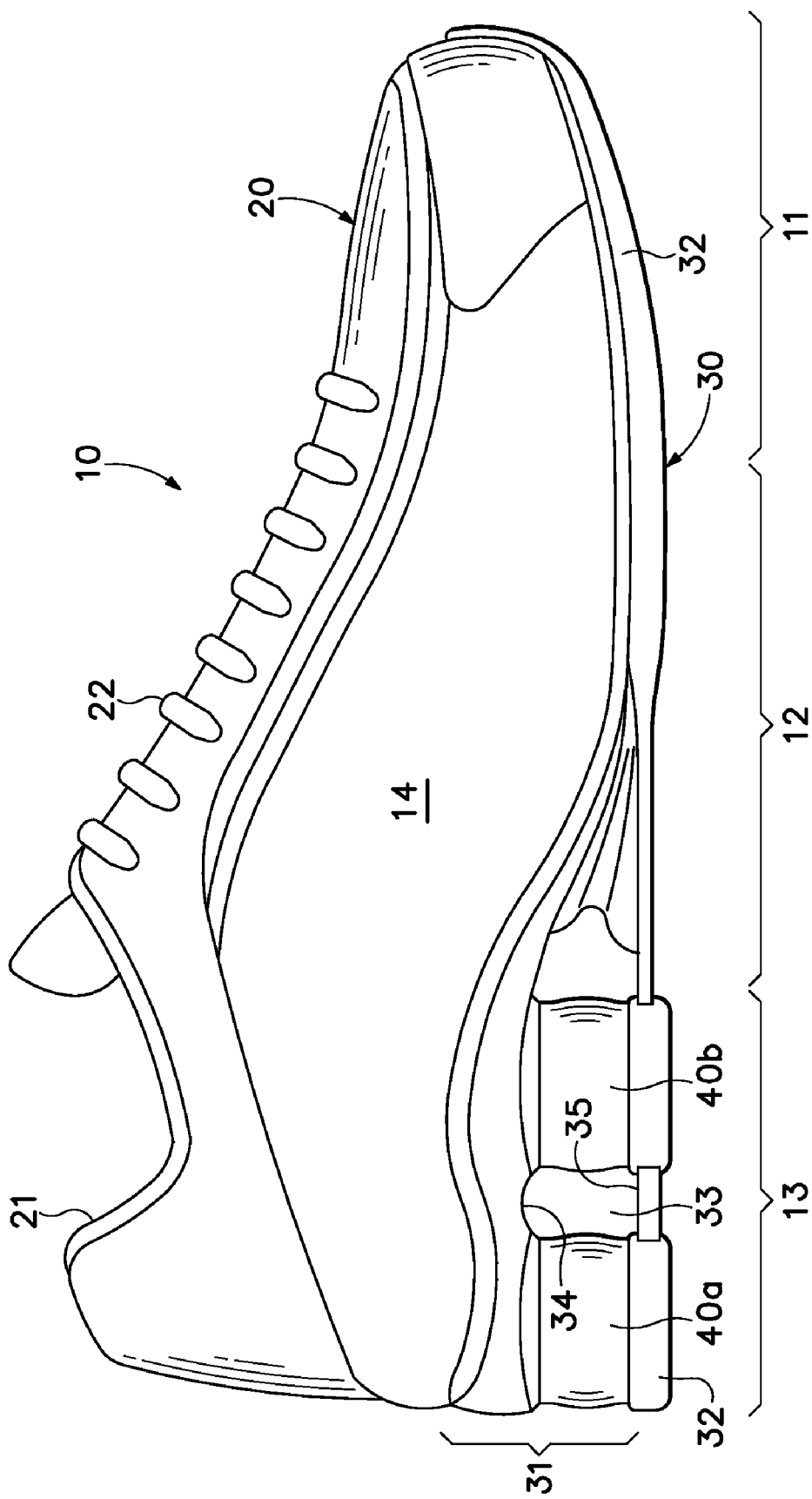
FIG. 1 is a lateral side elevational view of an article of footwear.
Figure 2:
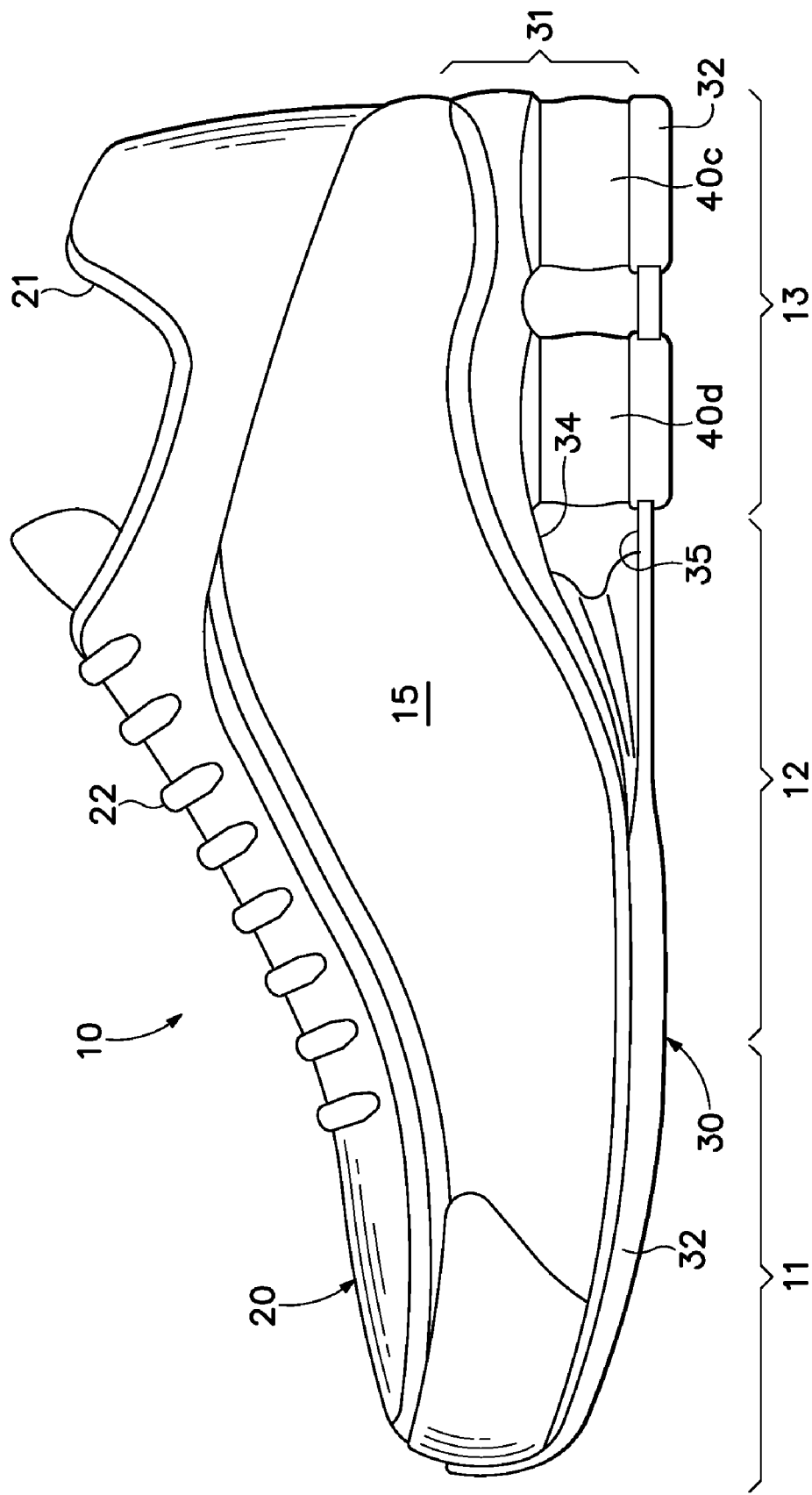
FIG. 2 is a medial side elevational view of the article of footwear.
Figure 3:
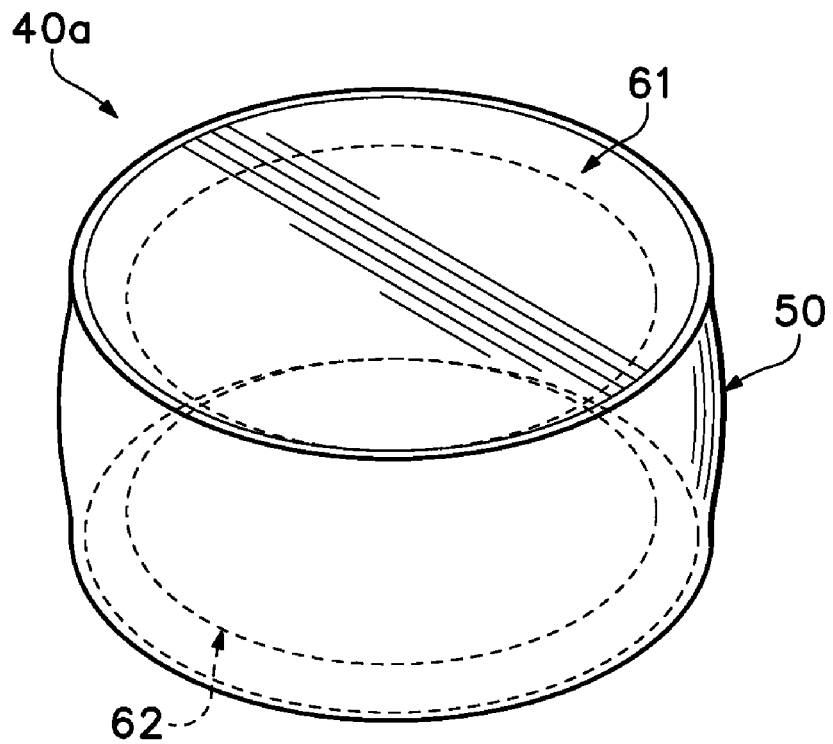
FIG. 3 is a perspective view of a support element of the article of footwear.
Figure 4:
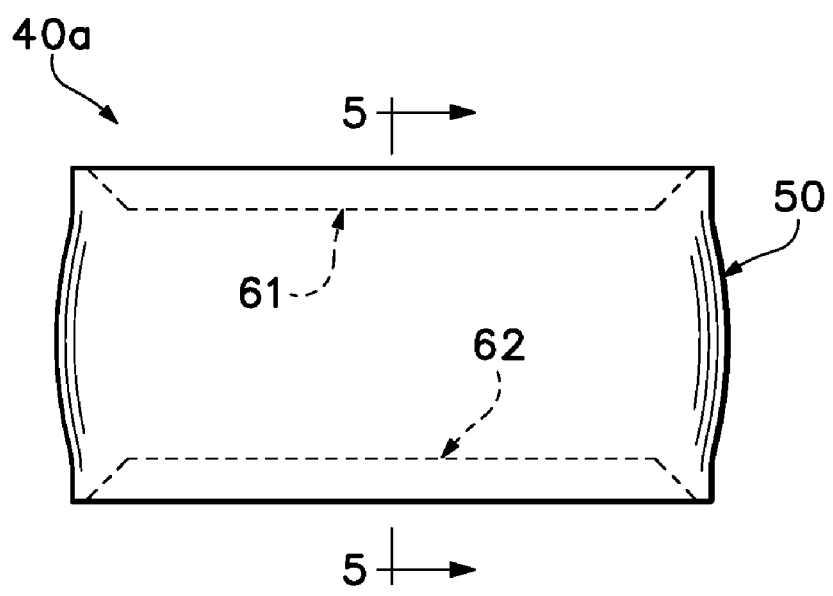
FIG. 4 is a side elevational view of the support element.

An article of footwear 10 is depicted in FIGS. 1 and 2 as including an upper 20 and a sole structure 30. For purposes of reference in the following material, footwear 10 may be divided into three general regions: a forefoot region 11, a midfoot region 12, and a heel region 13, as defined in FIGS. 1 and 2. In addition, footwear 10 includes two sides: lateral side 14 and medial side 15, as also defined in FIGS. 1 and 2. Lateral side 14 is positioned to extend along a lateral side of the foot and generally passes through each of regions 11-13. Similarly, medial side 15 is positioned to extend along an opposite medial side of the foot and generally passes through each of regions 11-13. Regions 11-13 and sides 14-15 are not intended to demarcate precise areas of footwear 10. Rather, regions 11-13 and sides 14-15 are intended to represent general areas of footwear 10 that provide a frame of reference during the following discussion. Although regions 11-13 and sides 14-15 apply generally to footwear 10, references to regions 11-13 and sides 14-15 may also apply specifically to upper 20, sole structure 30, or an individual component within either upper 20 or sole structure 30.

Upper 20 is secured to sole structure 30 and defines a cavity for receiving a foot. Access to the cavity is provided by an ankle opening 21 located in heel region 11. A lace 22 extends in a zigzag pattern through various apertures in upper 20. Lace 22 may be utilized in a conventional manner to selectively increase a size of ankle opening 21 and modify certain dimensions of upper 20, particularly girth, to accommodate feet with varying dimensions. Various materials are suitable for upper 20, including leather, synthetic leather, rubber, textiles, and polymer foams, for example, that are stitched or adhesively bonded together. The specific materials utilized for upper 20 may be selected to impart wear-resistance, flexibility, air-permeability, moisture control, and comfort. More particularly, different materials may be incorporated into different areas of upper 20 in order to impart specific properties to those areas. Furthermore, the materials may be layered in order to provide a combination of properties to specific areas. Although the configuration of upper 20 discussed above is suitable for footwear 10, upper 20 may exhibit the configuration of any conventional or non-conventional upper.

Sole structure 30 is secured to a lower surface of upper 20 and includes an outsole 31 and a midsole 32. Outsole 31 forms a ground-engaging surface of sole structure 30 and is formed of a durable, wear-resistant material, such as rubber, that is textured to enhance traction. In some embodiments, outsole 31 may be formed integral with midsole 32 or may be a lower surface of midsole 32. A conventional midsole is primarily formed of a polymer foam material, such as polyurethane or ethylvinylacetate, as discussed in the Background of the Invention section. In contrast with the structure of a conventional midsole, midsole 32 defines a void 33 in heel region 13 that includes four fluid-filled support elements 40a-40d. Void 33 extends through sole structure 30 from lateral side 14 to medial side 15 and has an upper surface 34 and an opposite lower surface 35. Although midsole 32 may be substantially formed from a polymer foam material, plates or other elements in midsole 32 may define void 33. Each of support elements 40a-40d extend between surfaces 34 and 35 to provide ground reaction force attenuation as footwear 10 impacts the ground during running, walking, or other ambulatory activities. In addition, support elements 40a-40d may impart stability or otherwise control foot motions, such as the degree of pronation. Sole structure 30 may also include an insole positioned within the cavity formed by upper 20 and located to contact a plantar (i.e., lower) surface of the foot, thereby enhancing the overall comfort of footwear 10.

Support Element Structure

The primary portions of support element 40a, as depicted in FIGS. 3-7, are a fluid-filled chamber 50 and a pair of inserts 61 and 62. Chamber 50 is a sealed bladder formed from a polymer material that encloses a pressurized fluid. The fluid places an outward force upon chamber 50 that tends to distend surfaces of chamber 50. That is, the fluid has sufficient pressure to cause various surfaces of chamber 50 to bulge or otherwise protrude outward. Surfaces 34 and 35 of void 33 have a generally planar configuration in areas where support element 40a contacts and is secured to midsole 31. Inserts 61 and 62 are secured to an exterior of chamber 50 to limit the distension in various surfaces of chamber 50 and provide generally planar areas that may join with surfaces 34 and 35 of void 33.

Chamber 50 has a generally cylindrical structure that includes a first surface 51, an opposite second surface 52, and a sidewall surface 53 extending between first surface 51 and second surface 52. Chamber 50 is formed, as described in greater detail below, from a pair of polymer barrier layers that are substantially impermeable to a pressurized fluid contained by chamber 50. One of the barrier layers forms both first surface 51 and sidewall surface 53, and the other of the barrier layers forms second surface 52. Accordingly, the barrier layers are bonded together around their respective peripheries to define a peripheral bond 54 that seals the pressurized fluid within chamber 50. In further embodiments, each of the barrier layers may form portions of sidewall surface 53 such that peripheral bond 54 is positioned between first surface 51 and second surface 52.

Inserts 61 and 62 have a generally circular structure and are bonded or otherwise secured to an exterior of chamber 50. More specifically, insert 61 is recessed into and secured to first surface 51, and insert 62 is recessed into and secured to second surface 52. Each of inserts 61 and 62 have a plate-like structure with two opposite surfaces and a tapered sidewall. That is, the area of the surface that faces outward is greater than the area of the surface that faces inward and is bonded to chamber 50, and the sidewall forms the taper between the two surfaces. In further embodiments, each of the surfaces of inserts 61 and 62 may have substantially equal areas.

Figure 5:
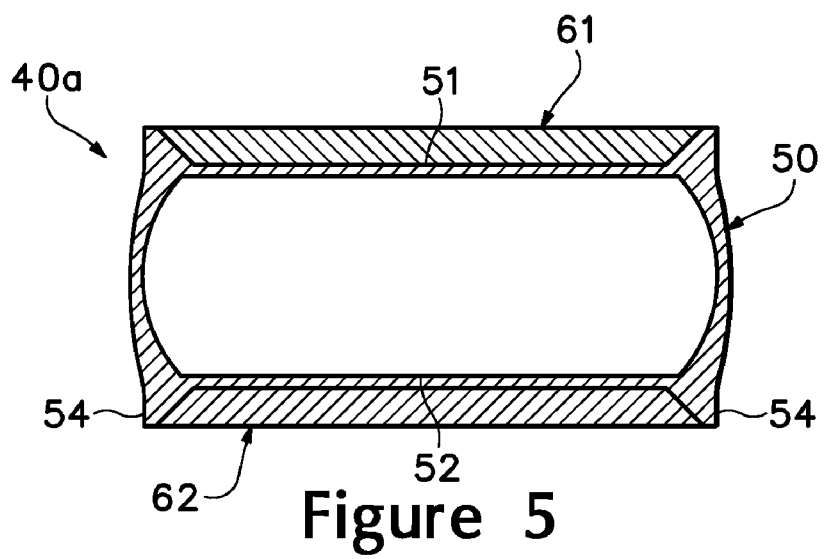
FIG. 5 is a cross-sectional view of the support element, as defined by section line 5-5 in FIG. 4.
Figure 6:
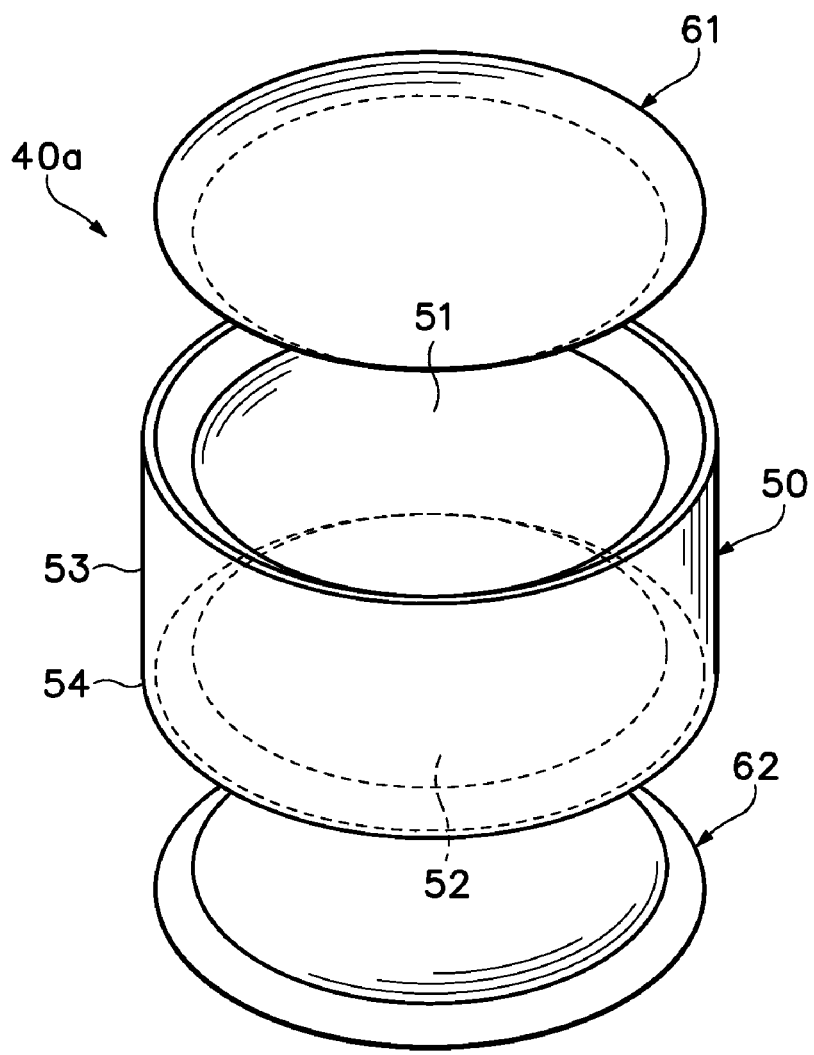
FIG. 6 is an exploded perspective view of the support element.
Figure 7:
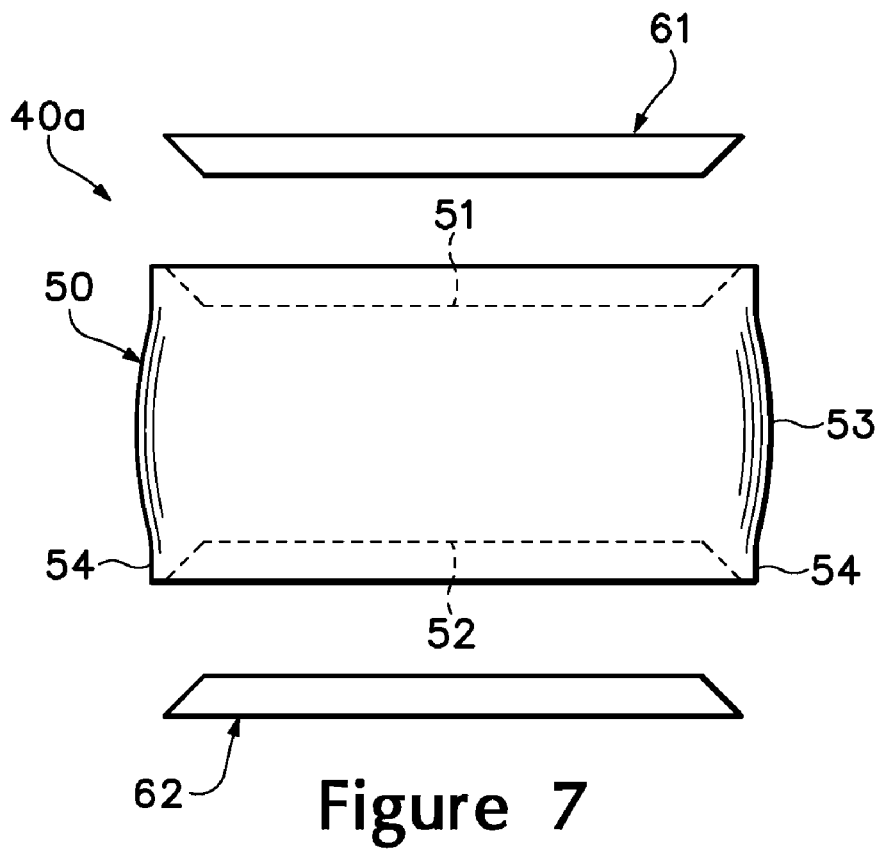
FIG. 7 is an exploded side elevational view of the support element.

Each of inserts 61 and 62 are recessed into chamber 50, as depicted in FIG. 5. More particularly, the polymer material of chamber 50 is secured to one surface and the tapered sidewall of each of inserts 61 and 62. The polymer material of chamber 50 extends, therefore, from a lower surface of support element 40a to an upper surface of support element 40a. Sidewall 53 forms, therefore, the exposed portion of support element 40a when incorporated into footwear 10. Inserts 61 and 62 may have a diameter that is equal to a diameter of surfaces 51 and 52. Alternatively, the diameter of inserts 61 and 62 may be in a range of 90% to 110%, for example, of a diameter of surfaces 51 and 52, or the diameter of inserts 61 and 62 may vary beyond this range. Accordingly, inserts 61 and 62 may have a lesser or greater area than surfaces 51 and 52.

Inserts 61 and 62 are depicted as being substantially identical to each other. In some embodiments, however, the diameters, thicknesses, or materials forming inserts 61 and 62 may be different. Furthermore, each of inserts 61 and 62 may include unique protrusions or indentations that assist with positioning support element 40a in void 33 of midsole 32. Each of inserts 61 and 62 are also depicted as having substantially constant thicknesses. In some embodiments, however, the thickness of insert 61, for example, may vary such that one side of insert 61 is thicker than an opposite side of insert 61. Similarly, the thickness of insert 61 may vary such that a central area is thicker than a peripheral area.

Figure 8:
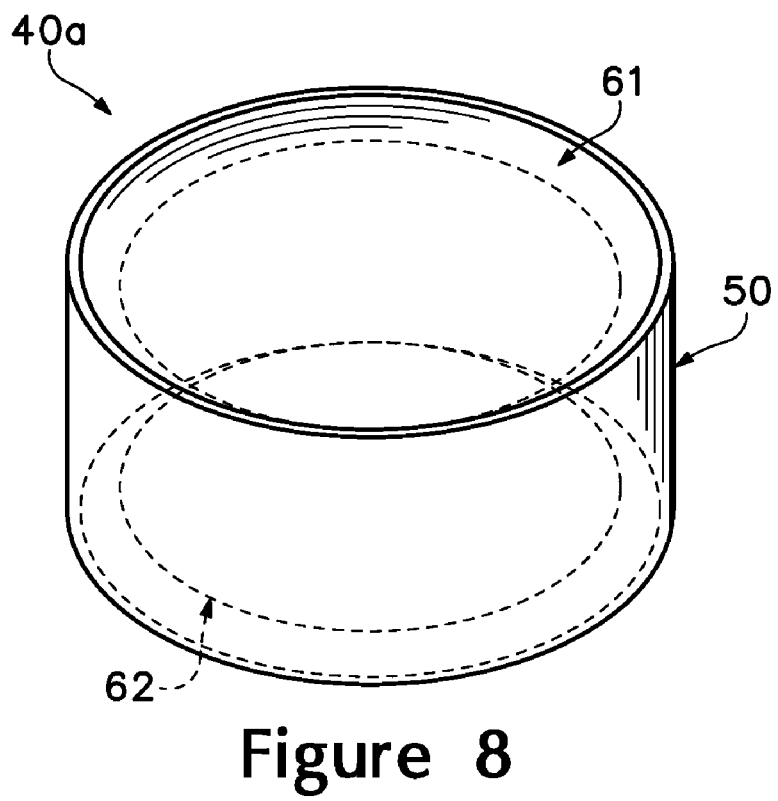
FIG. 8 is a perspective view of the support element in a non-pressurized configuration.
Figure 9:
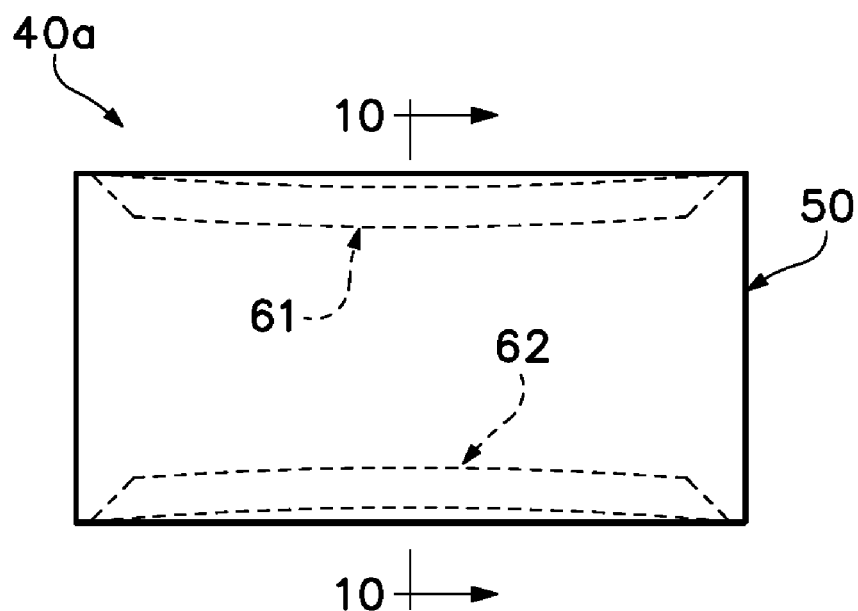
FIG. 9 is a side elevational view of the support element in the non-pressurized configuration.
Figure 10:
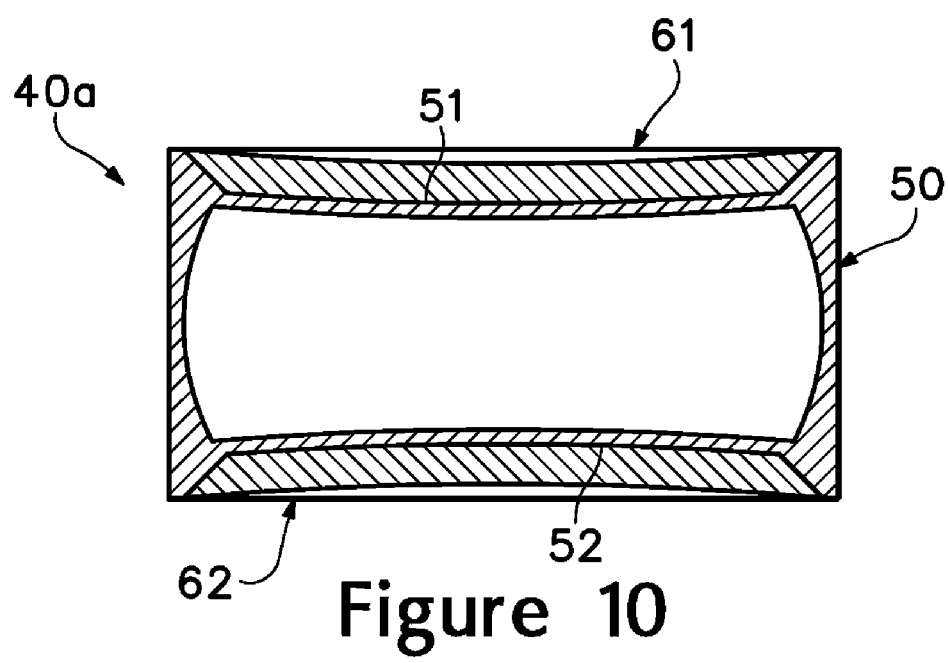
FIG. 10 is a cross-sectional view of the support element in the non-pressurized configuration, as defined by section line 10-10 in FIG. 9.

FIGS. 3-7 depict support element 40a in a pressurized configuration, wherein the fluid within support element 40a places an outward force upon first surface 51, second surface 52, and sidewall surface 53 due to differences in pressure between air surrounding chamber 50 and the fluid. For purposes of comparison, FIGS. 8-10 depict support element 40a in a non-pressurized configuration, wherein differences in pressure between air surrounding chamber 50 and the fluid are minimal. In the pressurized configuration, inserts 61 and 62 exhibit a substantially planar structure. That is, neither of inserts 61 and 62 exhibit substantial curvature or other non-planar characteristics. In the non-pressurized configuration, however, inserts 61 and 62 each bow inward and toward a center of support element 40a. That is, both of inserts 61 and 62 exhibit a curved structure in the non-pressurized configuration. Accordingly, the outward force of the pressurized fluid within chamber 50 tends to deform inserts 61 and 62 from a non-planar structure to a generally planar structure.

Support elements 40a-40d are devoid of internal connections between first surface 51 and second surface 52. That is, first surface 51 and second surface 52 are not connected through an interior of support elements 40a-40d. Some prior art fluid-filled bladders in footwear include a plurality of internal connections to prevent surfaces from bulging or otherwise protruding outward. The presence of inserts 61 and 62, however, limits the degree to which first surface 51 and second surface 52 protrude outward. Accordingly, internal connections between first surface 51 and second surface 52 are not necessary. In some embodiments, however, internal connections may be utilized.

A variety of thermoplastic polymer materials may be utilized for chamber 50, and particularly the barrier layers, including polyurethane, polyester, polyester polyurethane, and polyether polyurethane. Another suitable material for chamber 50 is a film formed from alternating layers of thermoplastic polyurethane and ethylene-vinyl alcohol copolymer, as disclosed in U.S. Pat. Nos. 5,713,141 and 5,952,065 to Mitchell et al, hereby incorporated by reference. A variation upon this material wherein the center layer is formed of ethylene-vinyl alcohol copolymer; the two layers adjacent to the center layer are formed of thermoplastic polyurethane; and the outer layers are formed of a regrind material of thermoplastic polyurethane and ethylene-vinyl alcohol copolymer may also be utilized. Chamber 50 may also be formed from a flexible microlayer membrane that includes alternating layers of a gas barrier material and an elastomeric material, as disclosed in U.S. Pat. Nos. 6,082,025 and 6,127,026 to Bonk et al., both hereby incorporated by reference. In addition, numerous thermoplastic urethanes may be utilized, such as PELLETHANE, a product of the Dow Chemical Company; ELASTOLLAN, a product of the BASF Corporation; and ESTANE, a product of the B.F. Goodrich Company, all of which are either ester or ether based. Still other thermoplastic urethanes based on polyesters, polyethers, polycaprolactone, and polycarbonate macrogels may be employed, and various nitrogen blocking materials may also be utilized. Additional suitable materials are disclosed in U.S. Pat. Nos. 4,183,156 and 4,219,945 to Rudy, hereby incorporated by reference. Further suitable materials include thermoplastic films containing a crystalline material, as disclosed in U.S. Pat. Nos. 4,936,029 and 5,042,176 to Rudy, hereby incorporated by reference, and polyurethane including a polyester polyol, as disclosed in U.S. Pat. Nos. 6,013,340; 6,203,868; and 6,321,465 to Bonk et al., also hereby incorporated by reference.

Inserts 61 and 62 may be formed from a diverse range of materials. Suitable materials for inserts 61 and 62 include polyester, thermoset urethane, thermoplastic urethane, various nylon formulations, blends of these materials, or blends that include glass fibers. In addition, inserts 61 and 62 may be formed from a high flex modulus polyether block amide, such as PEBAX, which is manufactured by the Atofina Company. Polyether block amide provides a variety of characteristics that benefit the present invention, including high impact resistance at low temperatures, few property variations in the temperature range of minus 40 degrees Celsius to positive 80 degrees Celsius, resistance to degradation by a variety of chemicals, and low hysteresis during alternative flexure. Another suitable material for inserts 61 and 62 is a polybutylene terephthalate, such as HYTREL, which is manufactured by E.I. duPont de Nemours and Company. Composite materials may also be formed by incorporating glass fibers or carbon fibers into the polymer materials discussed above in order to enhance the strength of inserts 61 and 62. The material forming inserts 61 and 62 may exhibit a greater modulus of elasticity than the material forming chamber 50. Whereas the material forming chamber 50 is generally flexible, the material forming inserts 61 and 62 may exhibit semi-rigid or rigid properties.

The fluid within chamber 50 may be any of the gasses disclosed in U.S. Pat. No. 4,340,626 to Rudy, hereby incorporated by reference, such as hexafluoroethane and sulfur hexafluoride, for example. The fluid may also include gasses such as pressurized octafluorapropane, nitrogen, or air. In addition to gasses, various gels or liquids may be sealed within chamber 50. Accordingly, a variety of fluids are suitable for chamber 50. With regard to pressure, a suitable fluid pressure is fifteen pounds per square inch, but may range from zero to thirty pounds per square inch. Accordingly, the fluid pressure within chamber 50 may be relatively high, or the fluid pressure may be at ambient pressure or at a pressure that is slightly elevated from ambient. When selecting a fluid pressure, considerations include the shape and thickness of inserts 61 and 62, the materials forming inserts 61 and 62, the materials forming chamber 50, the type of footwear insert 40a is used in, the weight of the wearer, and the sport the wearer with participate in, for example.

Each of support elements 40a-40d may enclose a fluid with a substantially similar fluid pressure. More particularly, the fluid pressure within support elements 40a-40d may be the same when sole structure 30 is in an uncompressed state. As portions of sole structure 30 are compressed, the fluid pressure will rise in those support elements 40a-40d that experience the greatest compression. For example, upon impact with the ground, support element 40a may be more compressed than support elements 40b-40d, and the fluid pressure within support element 40a will be greater than the fluid pressure within support elements 40b-40d. As footwear 10 comes to rest and sole structure 30 is no longer compressed, the fluid pressure within each of support elements 40a-40d will return to being the same. As an alternative, however, the fluid pressure within support elements 40a-40d may be different when sole structure 30 is in an uncompressed state. As an example, support element 40a may initially have a fluid pressure of 15 pounds per square inch and each of support elements 40b-40d may have a greater initial fluid pressure of 20 pounds per square inch. Accordingly, the relative pressures within support elements 40a-40d may vary significantly.

Manufacturing Process

One suitable manufacturing process for support element 40a is schematically-depicted in FIGS. 11A-11D and involves the use of a mold 70. A substantially similar process may be utilized for support elements 40b-40d. Mold 70 includes a first mold portion 71 and a corresponding second mold portion 72. When joined together, mold portions 71 and 72 define a cavity having dimensions substantially equal to the exterior dimensions of one of support elements 40a-40d. Mold 70 may be utilized for thermoforming chamber 50 and simultaneously bonding or otherwise securing inserts 61 and 62 to chamber 50. In general, inserts 61 and 62 are placed in or adjacent to mold portions 71 and 72, and a pair of barrier layers 41 and 42, formed from a thermoplastic polymer material, for example are placed between mold portions 71 and 72. Barrier layers 41 and 42, which form chamber 50, are then drawn into the contours of mold 70 such that inserts 61 and 62 are respectively recessed into and bonded to barrier layers 41 and 42. In addition, mold portions 71 and 72 compress barrier layers 41 and 42 together to form peripheral bond 54. Once barrier layers 41 and 42 have conformed to the shape of chamber 50, inserts 61 and 62 are bonded to barrier layers 41 and 42, and peripheral bond 54 is formed, chamber 50 may be pressurized with the fluid and sealed, thereby forming support element 40a.

The manner in which mold 70 is utilized to form support element 40a from barrier layers 41 and 42 and inserts 61 and 62 will now be discussed in greater detail. An injection-molding process, for example, may be utilized to form inserts 61 and 62 from the materials discussed above. If necessary, inserts 61 and 62 may then be cleansed with a detergent or alcohol, for example, in order to remove surface impurities, such as a mold release agent or fingerprints. The surfaces of inserts 61 and 62 may also be plasma treated to enhance bonding with chamber 50.

Figure 11A:
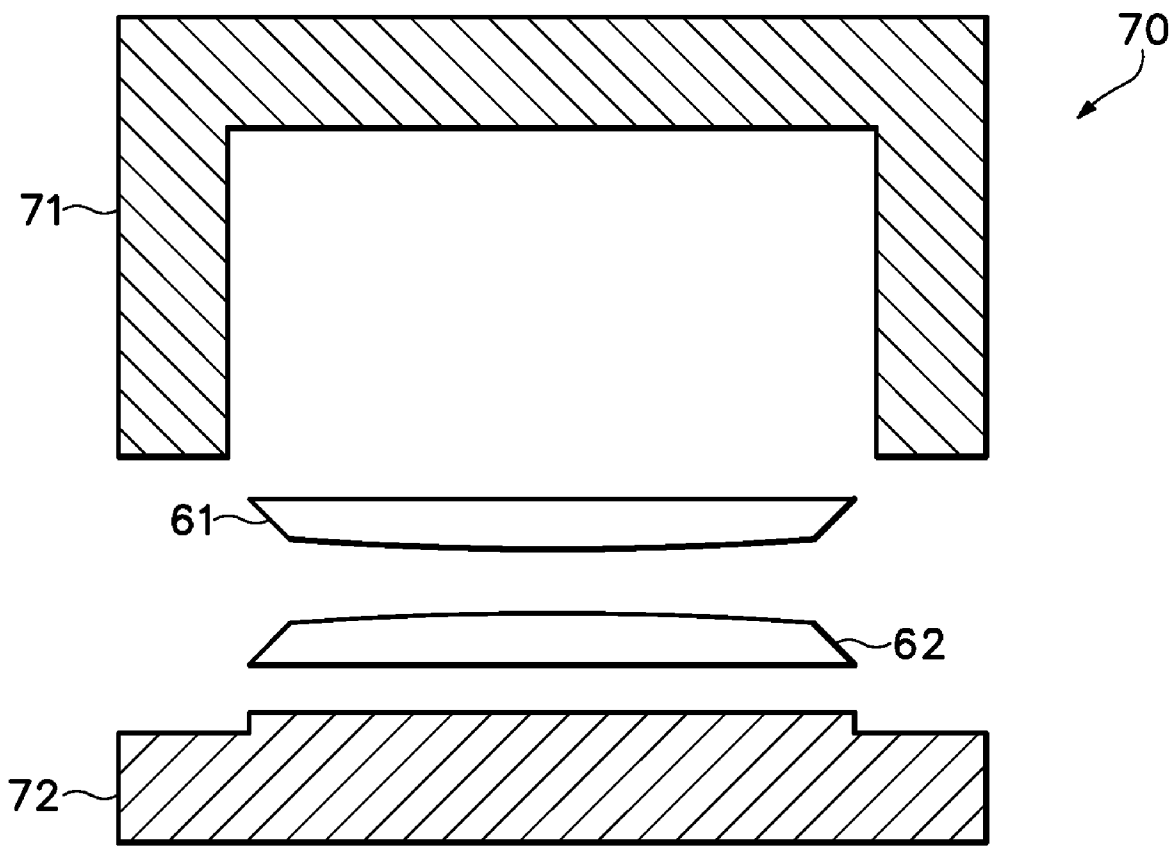
FIG. 11A-11D are schematic cross-sectional views of a mold depicting steps for manufacturing the support element.
Figure 11B:
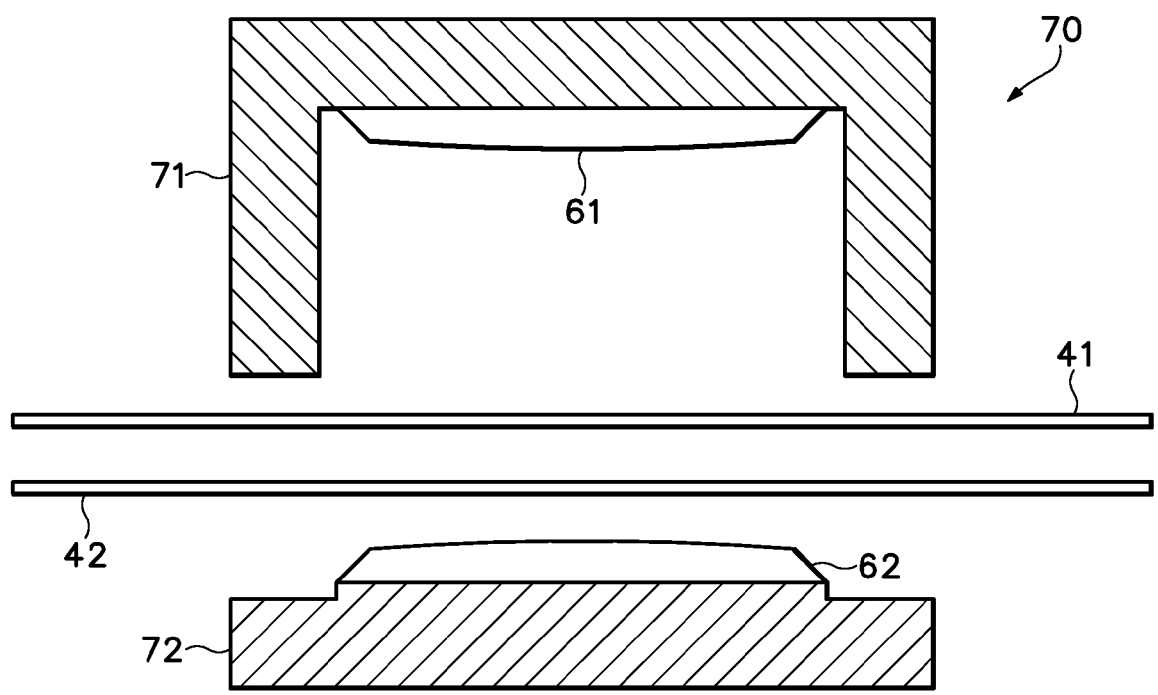

Following formation and cleansing, inserts 61 and 62 are placed between mold portions 71 and 72 and then positioned adjacent to mold portions 71 and 72, as depicted in FIGS. 11A and 11B. A variety of techniques may be utilized to secure inserts 61 and 62 to mold portions 71 and 72, including a vacuum system, various seals, or non-permanent adhesive elements, for example. In addition, inserts 61 and 62 may include various tabs that define apertures, and mold portions 71 and 72 may include protrusions that engage the apertures to secure inserts 61 and 62 within mold 70.

A plurality of conduits may extend through mold 70 in order to channel a heated liquid, such as water or oil, through mold 70, thereby raising the overall temperature of mold 70. As noted above, inserts 61 and 62 are positioned within mold 70, and inserts 61 and 62 conduct the heat from mold 70, thereby raising the temperature of inserts 61 and 62. In some embodiments of the invention, inserts 61 and 62 may be heated prior to placement within mold 70 in order to decrease manufacturing times, or various conductive or radiative heaters may be utilized to heat inserts 61 and 62 while located within mold 70. The temperature of mold 70 may vary depending upon the specific materials utilized for support element 40a. Following placement of inserts 61 and 62 within mold 70, barrier layers 41 and 42 are heated and positioned between mold portions 71 and 72, as depicted in FIG. 11B. The temperature to which barrier layers 41 and 42 are heated also depends upon the specific material used.

The thickness of barrier layer 41 prior to molding may be greater than the thickness of barrier layer 42. Although barrier layers 41 and 42 may exhibit different thicknesses prior to molding, each of barrier layers 41 and 42 may have a substantially uniform thickness following molding. Although the thickness of barrier layers 41 and 42 may vary significantly, a suitable thickness range for barrier layer 41 prior to molding is 0.045 to 0.110 inches, with one preferred thickness being 0.090 inches, and a suitable thickness range for barrier layer 42 prior to molding is 0.035 to 0.065 inches, with one preferred thickness being 0.045 inches. Whereas barrier layer 42 only forms second surface 52 of chamber 50, barrier layer 41 forms both first surface 51 and sidewall surface 53 of chamber 50. The rationale for the difference in thickness is that barrier layer 41 may stretch to a greater degree than barrier layer 42 in order to form both surface 51 and sidewall surface 53. Accordingly, differences between the original, pre-stretched thicknesses of barrier layers 41 and 42 compensate for thinning in barrier layer 41 that may occur when barrier layer 41 is stretched or otherwise distorted during the formation of first surface 51 and sidewall surface 53.

Figure 11C:
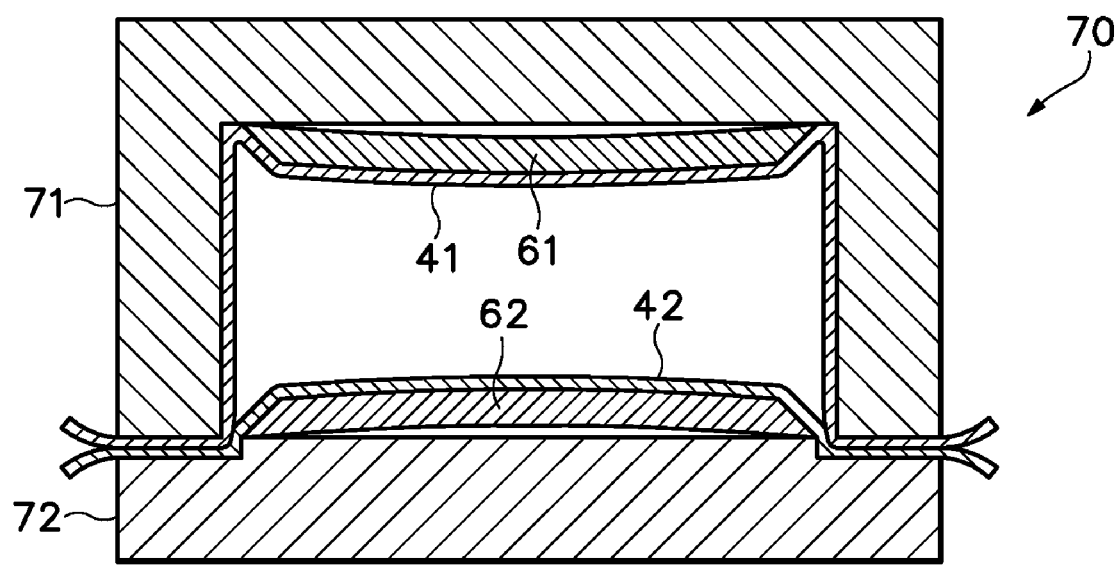

Once inserts 61 and 62 and barrier layers 41 and 42 are positioned, mold portions 71 and 72 translate toward each other such that barrier layers 41 and 42 are shaped, as depicted in FIG. 11C. As mold 70 contacts and compresses portions of barrier layers 41 and 42, a fluid, such as air, having a positive pressure in comparison with ambient air may be injected between barrier layers 41 and 42 to induce barrier layers 41 and 42 to respectively contact and conform to the contours of mold portions 71 and 72. Air may also be removed from the area between barrier layers 41 and 42 and mold portions 71 and 72 through various vents, thereby drawing barrier layers 41 and 42 onto the surfaces of mold portions 71 and 72. That is, at least a partial vacuum may be formed between the barrier layers 41 and 42 and the surfaces of mold portions 71 and 72. In addition, drawing barrier layers 41 and 42 onto the surfaces of mold portions 71 and 72 also draws barrier layers 41 and 42 into contact with inserts 61 and 62. Accordingly, barrier layers 41 and 42 contact and are bonded to inserts 61 and 62 during this portion of the manufacturing process.

As the area between barrier layers 41 and 42 is pressurized and air is removed from the area between mold 70 and barrier layers 41 and 42, barrier layers 41 and 42 conform to the shape of mold 70 and are bonded together. More specifically, barrier layers 41 and 42 stretch, bend, or otherwise conform to extend along the surfaces of the cavity within mold 70 and form the general shape of chamber 50. Although barrier layers 41 and 42 conform to extend along the surfaces of the cavity, barrier layers 41 and 42 generally do not contact the portions of mold portions 71 and 72 that are covered by inserts 61 and 62. Rather, barrier layer 41 contacts and is compressed against the inward-facing surface of insert 61, thereby bonding barrier layer 41 to insert 61. Similarly, barrier layer 42 contacts and is compressed against the inward-facing surface of insert 62, thereby bonding barrier layer 42 to insert 62.

The various outward-facing surfaces of inserts 61 and 62 are generally flush with surfaces of chamber 50. As air pressurizes the area between barrier layers 41 and 42 and air is drawn out of mold 70, barrier layers 41 and 42 and inserts 61 and 62 are compressed against surfaces of mold 70. Barrier layer 41 contacts the inward-facing surface of insert 61, conforms to the shape of insert 61, extends around the tapered sides of insert 61, and contacts the surface of mold portion 71. In this manner, insert 61 is recessed into chamber 50. Similarly, barrier layer 42 contacts the inward-facing surface of insert 62, conforms to the shape of insert 62, extends around the tapered sides of insert 62, and contacts the surface of mold portion 72. In this manner, insert 62 is recessed into chamber 50.

During bonding of barrier layers 41 and 42 to inserts 61 and 62, air may become trapped between barrier layer 41 and insert 61 and between barrier layer 42 and insert 62, thereby reducing the effectiveness of the bond. In order to facilitate the removal of air from the area between barrier layers 41 and 42 and inserts 61 and 62, a plurality of apertures may be formed through selected locations of inserts 61 and 62. These apertures may provide outlets for air and may correspond in position with the various vents in mold 70.

Figure 11D:
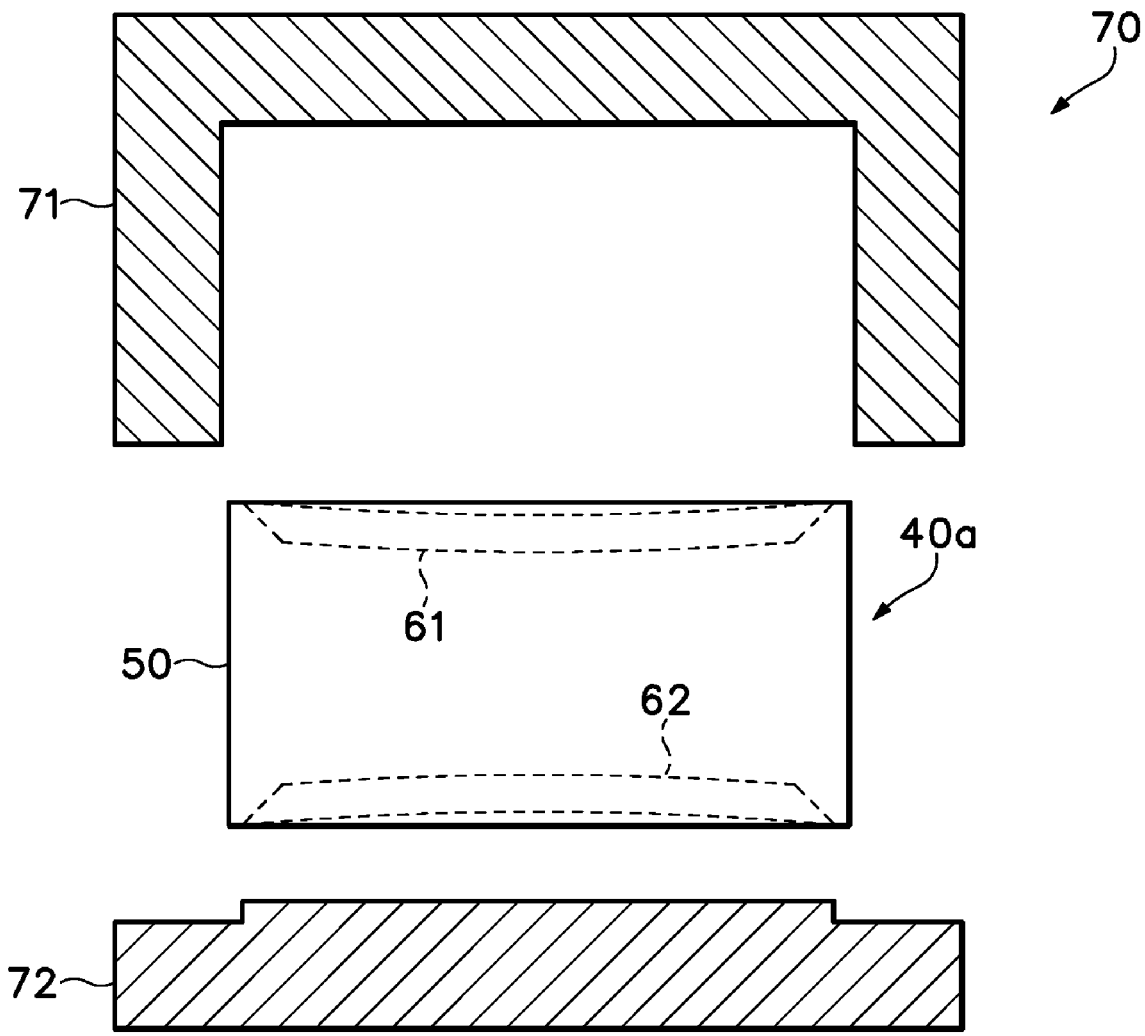

Once support element 40a is formed within mold 70, mold portions 71 and 72 separate such that the combination of chamber 50 and inserts 61 and 62 may be removed from mold 70, as depicted in FIG. 11D. The polymer materials forming chamber 50 and inserts 61 and 62 are then permitted to cool, and a pressurized fluid may be injected in a conventional manner. As an example, a conduit formed during the bonding of barrier layers 41 and 42 may be utilized to inject the fluid, and the conduit may then be sealed at a position that corresponds with peripheral bond 54 to seal chamber 50. In addition, excess portions of barrier layers 41 and 42 may be trimmed or otherwise removed from support element 40a. The excess portions may then be recycled or reutilized to form additional barrier layers. When each of support elements 40a-40d are formed using a single mold, excess portions of barrier layers 41 and 42 may remain in order to form a support component, as in FIG. 12, that may be incorporated into footwear 10.

The configurations of mold portions 71 and 72 affect the placement of peripheral bond 54. One advantage of placing peripheral bond 54 at the interface of second surface 52 and sidewall surface 53 is that unobstructed visibility is retained through exposed portions of sidewall surface 53. This configuration requires that barrier layer 41 stretch to a greater degree than barrier layer 42 in order to also form sidewall surface 53. In further embodiments of the invention, however, peripheral bond 54 may be positioned at a midpoint of sidewall surface 53, or peripheral bond 54 may be positioned at the interface of first surface 51 and sidewall surface 53. Accordingly, the elevation of peripheral bond 54 may be selected to limit or otherwise control the degree of stretch in barrier layers 41 and 42.

As barrier layers 41 and 42 stretch during the thermoforming process, the thickness of barrier layers 41 and 42 decreases. The desired resulting thickness of barrier layers 41 and 42 generally depends upon the specific use and configuration of footwear 10. Selecting the position of peripheral bond 54 and the initial thicknesses of barrier layers 41 and 42 provides control over the degree of stretch in barrier layers 41 and 42. Accordingly, the position of peripheral bond 54 and the initial thicknesses of barrier layers 41 and 42 may be selected in order to minimize the overall thickness of bladder chamber 50 while retaining sufficient strength.

Although the thermoforming process discussed above is a suitable manner of forming support element 40a, a blow-molding process may also be utilized. In general, a suitable blow-molding process involves positioning inserts 61 and 62 within at least one of two mold portions and then positioning a parison between the mold portions, such as mold portions 71 and 72. The parison is a generally hollow and tubular structure of molten polymer material. In forming the parison, the molten polymer material is extruded from a die. The wall thickness of the parison may be substantially constant, or may vary around the perimeter of the parison. Accordingly, a cross-sectional view of the parison may exhibit areas of differing wall thickness. Suitable materials for the parison include the materials discussed above with respect to chamber 50. Following placement of the parison between the mold portions, the mold portions close upon the parison and pressurized air within the parison induces the liquefied elastomeric material to contact the surfaces of the mold. In addition, closing of the mold portions and the introduction of pressurized air induces the liquefied elastomeric material to contact the surfaces of inserts 61 and 62. Air may also be evacuated from the area between the parison and the mold to further facilitate molding and bonding. Accordingly, support element 40a may also be formed through a blow molding process wherein inserts 61 and 62 are placed within the mold prior to the introduction of the molten polymer material.

A variety of other manufacturing techniques may also be utilized to form support element 40a, in addition to thermoforming and blow-molding. For example, chamber 50 may be formed separate from inserts 61 and 62 and subsequently bonded together. A dual-injection technique may also be utilized to simultaneously form chamber 50 and inserts 61 and 62 from separate materials. In some embodiments, a first element corresponding with first surface 51 and sidewall surface 53 may be formed, a second element corresponding with second surface 52 may be joined thereto, and a pair of third elements corresponding with inserts 61 and 62 may then be secured to the exterior. Accordingly, structures having the general shape and features of support element 40a may be formed from a variety of processes.

The above discussion related to the formation of support element 40a. The various concepts discussed above apply, however, to each of support elements 40b-40d. Accordingly, a substantially similar procedure may be utilized to manufacture support elements 40b-40d. The various concepts discussed above may also be applied to other support element configurations.

Exemplar Support Element Variations

Support elements 40a-40d are arranged such that support element 40a is positioned adjacent lateral side 14, support element 40b is positioned adjacent lateral side 14 and forward of support element 40a, support element 40c is positioned adjacent medial side 15, and support element 40d is positioned adjacent medial side 15 and forward of support element 40c. Accordingly, support elements 40a-40d are arranged in a square configuration. In further embodiments, support elements 40a-40d may be offset from each other, or a lesser or greater number of support elements may be located within heel region 13. Additional support elements similar to support elements 40a-40d may also be positioned in one or both of forefoot region 11 and midfoot region 12. Alternatively, support elements similar to support elements 40a-40d may be limited to either of forefoot region 11 and midfoot region 12. Accordingly, the number and positions of support elements 40a-40d may vary significantly.

The structure of support element 40a, and the structures of support elements 40b-40d, may vary significantly from the general structure discussed above and depicted in FIGS. 1-10. As an example, support elements 40a-40d may be formed to exhibit a shape that varies from cylindrical to include cubic and spherical. Alternately, sidewall surface 53 may have an elliptical, triangular, or hexagonal shape in cross-section, for example. In some embodiments, inserts 61 and 62 may have a planar shape in the non-pressurized configuration that becomes outwardly-curved in the pressurized configuration. Inserts 61 and 62 may also be bonded to chamber 50 in a manner that does not include recessing inserts 61 and 62 into surfaces 51 and 52.

Inserts 61 and 62 are bonded to upper and lower surfaces of void 33 in midsole 32, thereby securing support element 40a to footwear 10. Accordingly, midsole 32 may include one or more plates, for example, that include bonding locations for support element 40a. In further embodiments, inserts 61 and 62 may be formed of unitary (i.e., one-piece) construction with the plates. That is, inserts 61 and 62 may be formed of unitary construction with the polymer foam, plates, or other elements of midsole 31 that define void 33. This configuration reduces the number of connections necessary to join support element 40a to midsole 31, and may also increase durability and reduce the number of manufacturing steps necessary for footwear 10.

Support elements 40b-40d are depicted as having a substantially identical structure to support element 40a. In some embodiments of the invention, however, the relative heights of support elements 40a-40d may vary, or the pressures of the fluid within support elements 40a-40d may vary. In order to limit pronation (i.e., roll of the foot from lateral side 14 to medial side 15), support elements 40a and 40b may have a lesser fluid pressure than support elements 40c and 40d, or the thickness of the barrier layers forming support elements 40a and 40b may be less than the thickness of the barrier layers forming support elements 40c and 40d. Accordingly, the relative structures of support elements 40a-40d may vary significantly.

Each of inserts 61 and 62 are described above as having a plate-like structure with two opposite surfaces and a tapered sidewall. In further embodiments, one or both of inserts 61 and 62 may define various ribs that enhance the stiffness of inserts 61 and 62. Inserts 61 and 62 may also be formed to have various apertures that define a grid-like structure. Furthermore, inserts 61 and 62 may each be formed of two or more elements that are recessed into surfaces 51 and 52. For example, the two elements may be formed of different materials to impart different properties to areas of support elements 40a-40d. Accordingly, inserts 61 and 62 may have a variety of configurations, in addition to the configuration of a plate.

Figure 12:
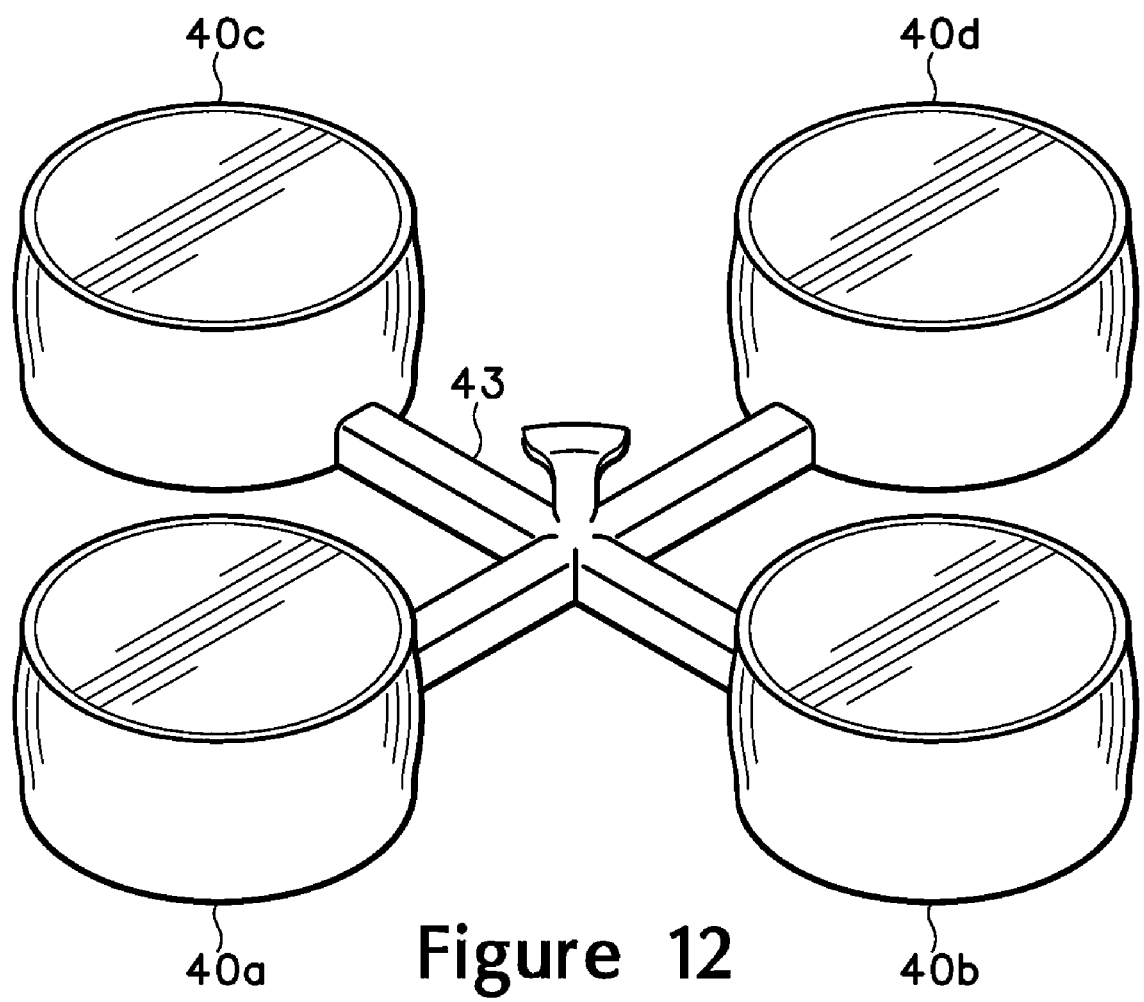
FIG. 12 is a perspective view of a support component having four support elements.

The specific configurations of support elements 40a-40d disclosed above are intended to provide an example of support elements within the scope of aspects of the present invention. Various alternate configurations, however, may also be utilized. Referring to FIG. 12, a support component having support elements 40a-40d connected by an x-shaped conduit 43 is depicted. In contrast with the individual support elements 40a-40d disclosed above, conduit 43 places each of support elements 40a-40d in fluid communication. When support elements 40a-40d are formed as individual elements, a pressure increase associated with one of support elements 40a-40d does not increase pressure within other support elements 40a-40d. When connected by conduit 43, however, increases in pressure are uniformly distributed among the various support elements 40a-40d. In forming the support component, support elements 40a-40d may be formed as a unit or each of support elements 40a-40d may be formed separately and subsequently joined.

As noted above, the fluid pressure within support elements 40a-40d may be the same when sole structure 30 is in an uncompressed state. Conduit 43 may be utilized to ensure that the fluid pressure in each of support elements 40a-40d is substantially identical. That is, the support component having support elements 40a-40d and conduit 43 may be formed and pressurized. In this state, each of support elements 40a-40d will have a substantially identical fluid pressure. Conduit 43 can then be sealed or otherwise blocked to remove support elements 40a-40d from fluid communication with each other. In effect, therefore, sealing conduit 43 will isolate each of support elements 40a-40d from fluid communication and ensure that the initial pressure within each of support elements 40a-40d is substantially identical.

Sealing conduit 43 may also utilized to isolate one of support elements 40a-40d from fluid communication with other support elements 40a-40d. For example, the portion of conduit 43 adjacent to support element 40a may be sealed to prevent fluid communication between support element 40a and each of support elements 40b-40d. Sealing only a portion of conduit 43 may also be utilized to vary the fluid pressure among support elements 40a-40d. For example, the support component having support elements 40a-40d may be inflated to a first pressure, and the portion of conduit 43 adjacent to support element 40a may be sealed to prevent further pressure increases. The remaining support elements 40b-40d may then be pressurized to a higher fluid pressure. A similar process is disclosed in U.S. Pat. No. 5,353,459 to Potter, et al.

Additional Footwear Configuration

Figure 13:
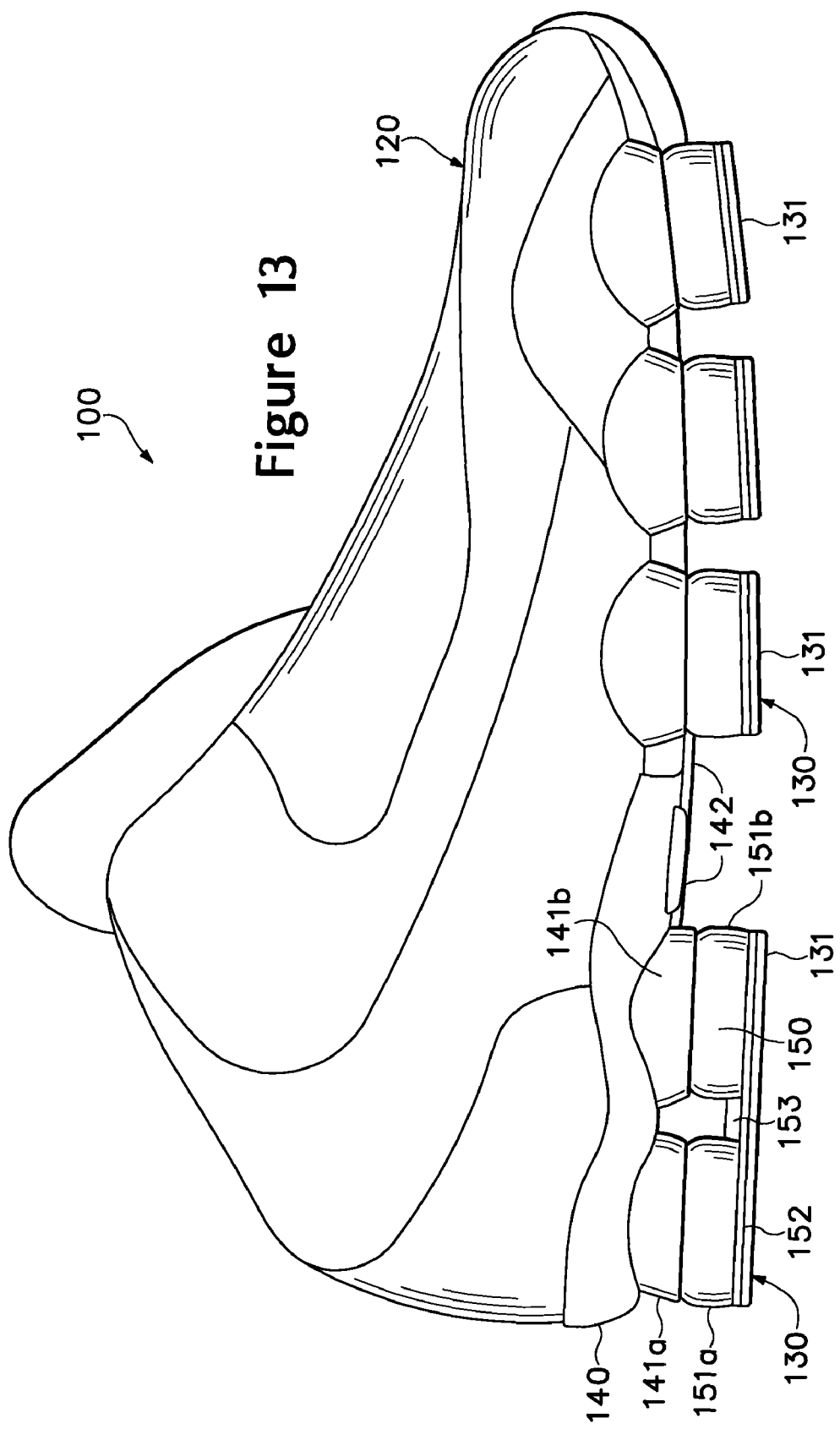
FIG. 13 is a lateral side elevational view of another article of footwear.
Figure 14:
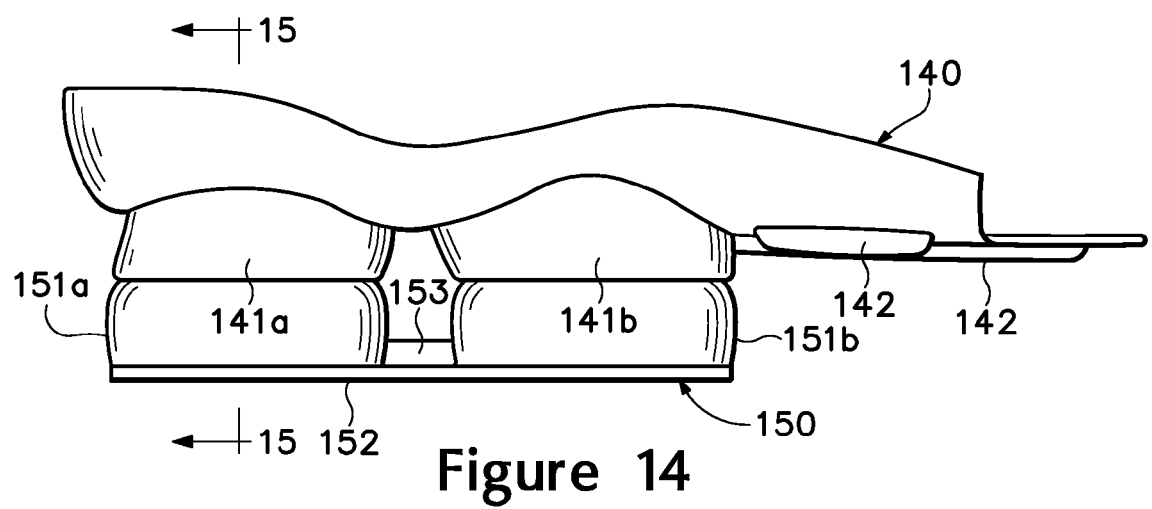
FIG. 14 is a side elevational view of a portion of the article of footwear depicted in FIG. 13.
Figure 15:
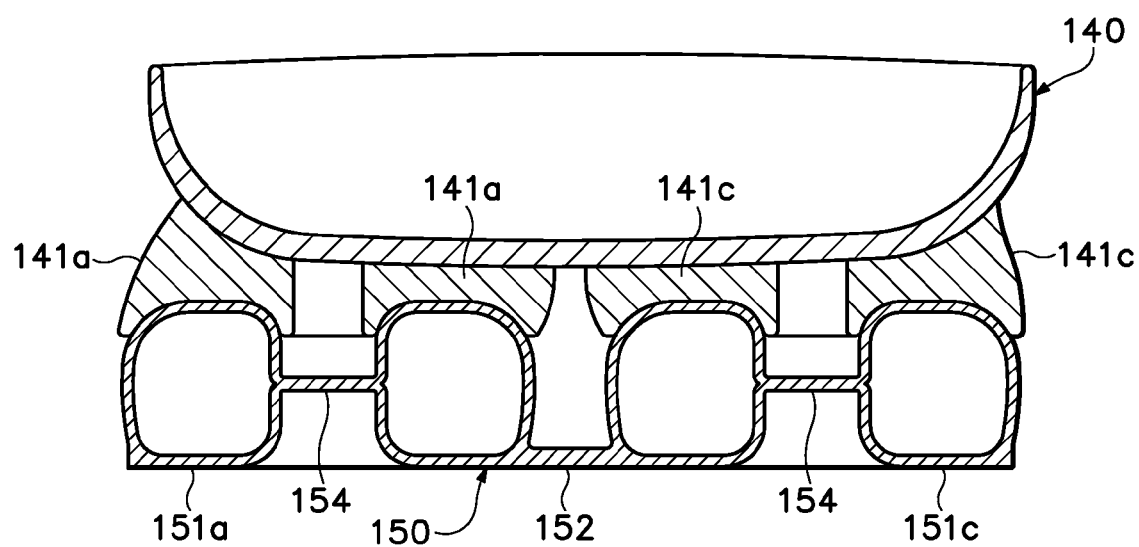
FIG. 15 is a cross-sectional of the portion of the article of footwear, as defined by section line 15-15 in FIG. 14.
Figure 16:
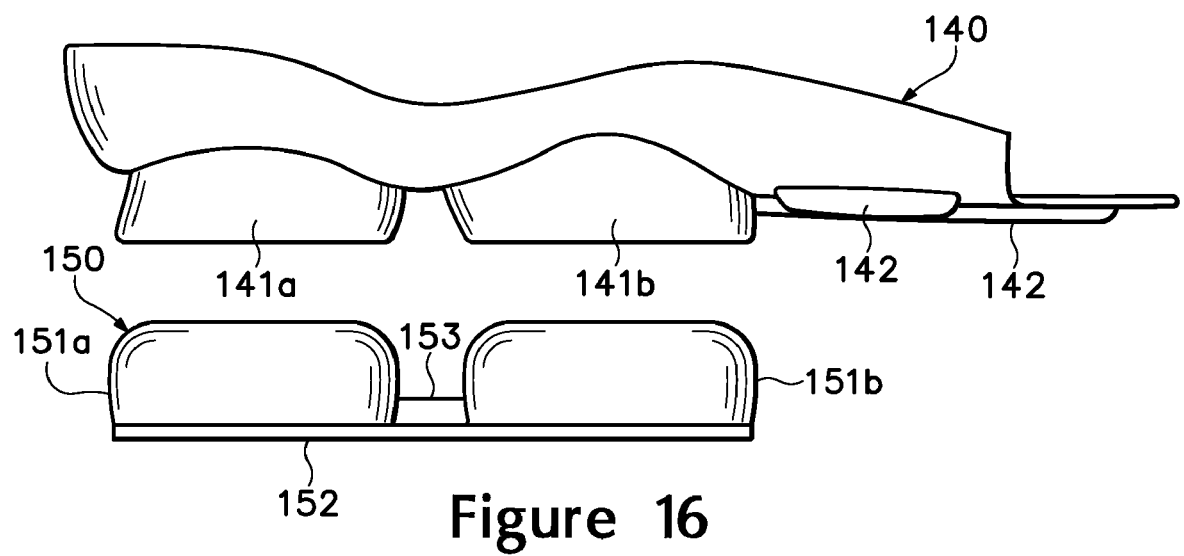
FIG. 16 is an exploded side elevational view of the portion of the article of footwear depicted in FIG. 13.

Another article of footwear 100 is depicted in FIG. 13 as including an upper 120 and a sole structure 130. Upper 120 is secured to sole structure 130 and may exhibit the general configuration of upper 20 or any conventional or non-conventional upper. For purposes of example, a portion of sole structure 130 that is primarily located in a heel region of footwear 100 is depicted in FIGS. 14-16. This portion of sole structure 130 is secured to a lower surface of upper 120 and includes an outsole 131, a plate 140, and a support component 150. Outsole 131 forms a ground-engaging surface of sole structure 130 and may be formed from one or more durable, wear-resistant elements that are textured to enhance traction. Plate 140 is positioned adjacent to upper 120 and provides a surface for attaching chambers 150. In some embodiments, a polymer foam material, such as polyurethane or ethylvinylacetate, may extend between plate 140 and upper 120. Support component 150 extends between plate 140 and outsole 131 and includes four chambers 151a-151d. Other portions of sole structure 130 located in a midfoot and forefoot region may have a similar configuration.

Figure 17:
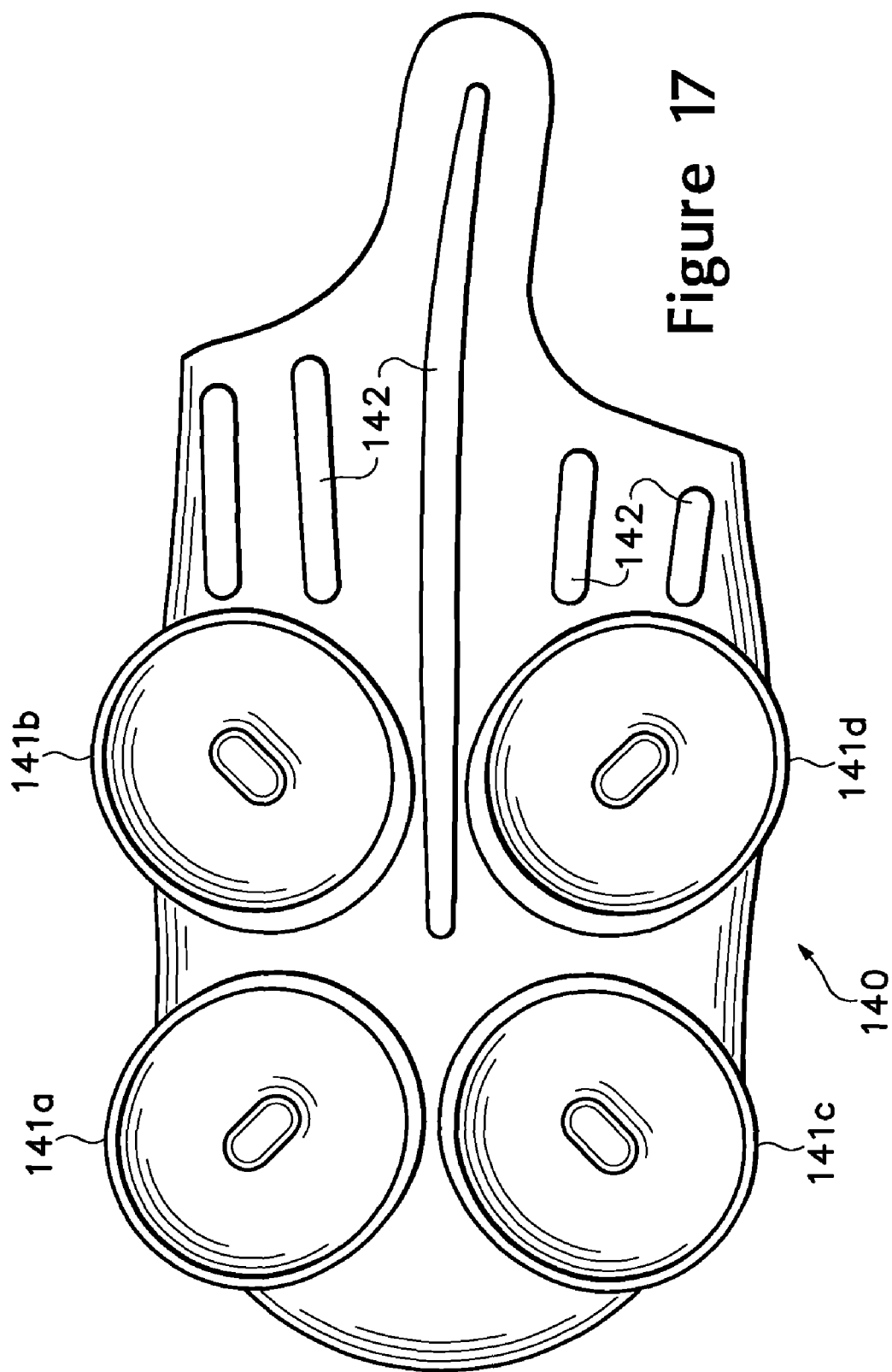
FIG. 17 is a bottom plan view of a plate member of the article of footwear depicted in FIG. 13.
Figure 18:
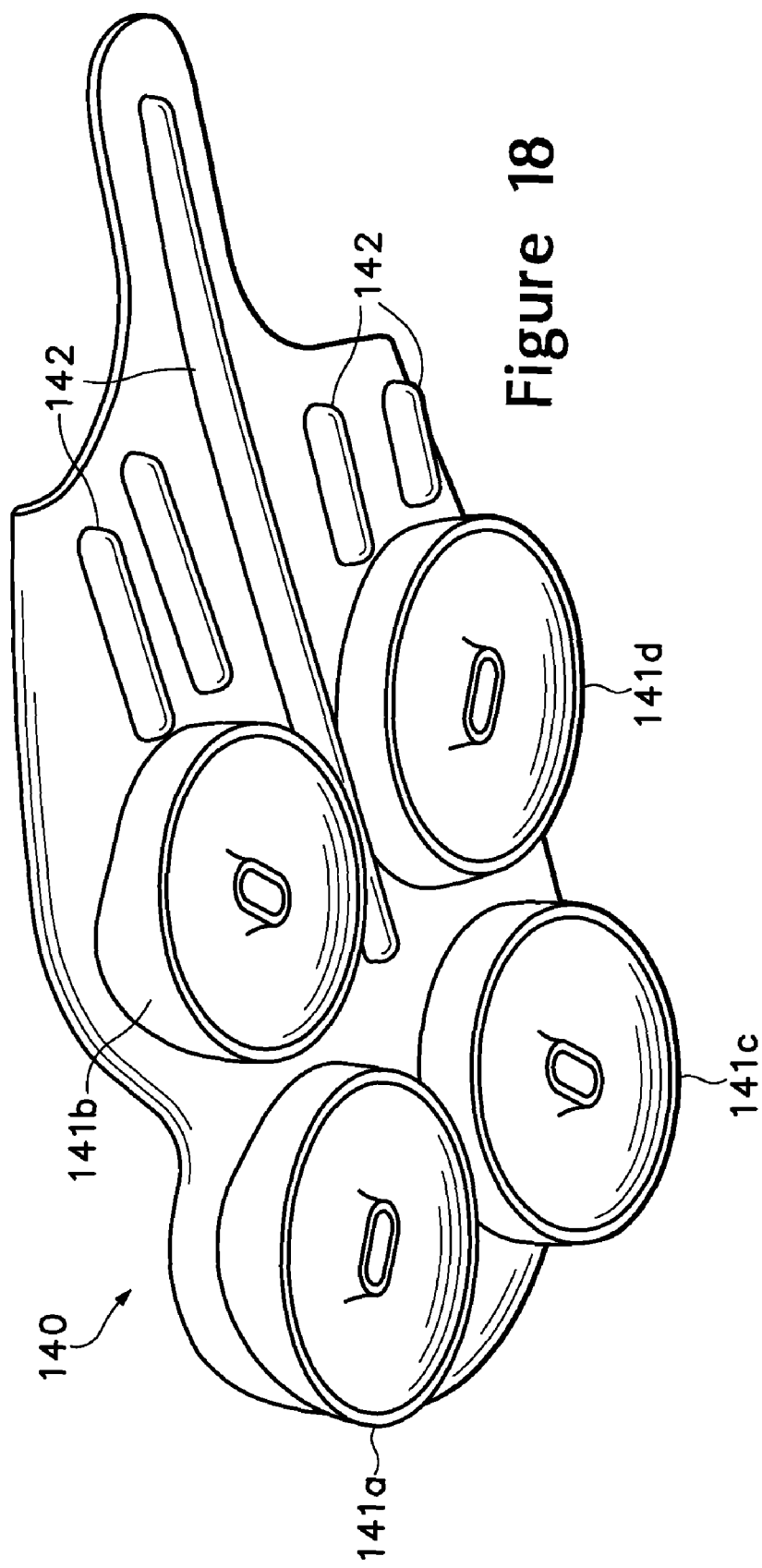
FIG. 18 is a perspective view of the plate member.

Plate 140 is formed from a semi-rigid polymer material and extends along a lower surface of upper 120. As depicted in FIGS. 17 and 18, a lower surface of plate 140 defines four attachment members 141a-141d and a plurality of ribs 142. Attachment members 141a-141d are formed of unitary (i.e., one-piece) construction with plate 140 and extend downward from plate 140 to respectively engage chambers 151a-151d, and the lower surfaces of attachment members 141a-141d are contoured to mate with chambers 151a-151d. Ribs 142 extend in a longitudinal direction of footwear 100 and enhance the stiffness of sole structure 130.

Suitable materials for plate 140 include a variety of polymer materials and any of the materials discussed above for inserts 61 and 62, for example. In some embodiments, attachment members 141a-141d may be formed of a different material than a remainder of plate 140. Similarly, attachment members 141a-141d may be formed of a material with a different color than the remainder of plate 140. As an example, attachment members 141a-141d may be formed from a clear or at least partially clear material, whereas the remainder of plate 140 may be formed from a colored and opaque material. Other properties, such as hardness and density, may also vary between attachment members 141a-141d and the remainder of plate 140. Accordingly, a dual injection molding process, for example, may be utilized to form plate 140. In some embodiments, attachment members 141a-141d may be formed separate from plate 140 and subsequently attached during the manufacture of footwear 100.

Support component 150 is formed from a barrier material that is substantially impermeable to a pressurized fluid contained by chambers 151a-151d. As with chamber 50 discussed above, each of chambers 151a-151d may be formed from a first barrier layer that is bonded to a second barrier layer. More particularly, the first barrier layer may define a first surface and a sidewall surface of chambers 151a-151d, and the second barrier layer may define a second surface of chambers 151a-151d. Accordingly, the barrier layers may be bonded together around the peripheries of chambers 151a-151d to define peripheral bonds that seal the pressurized fluid within support component 150. In further embodiments, each of the barrier layers may form portions of the sidewall surface such that the peripheral bonds are positioned between the first surface and the second surface.

The barrier layers forming support component 150 extends between chambers 151a-151d to form a base 152 that connects chambers 151a-151d. When incorporated into footwear 100, base 152 is positioned adjacent outsole 131, but may be positioned adjacent plate 140. An x-shaped conduit 153 places each of chambers 151a-151d in fluid communication. Accordingly, an increase in pressure within one of chambers 151a-151d induces a corresponding increase in pressure in the other chambers 151a-151d. In some embodiments, conduit 153 may be absent such that chambers 151a-151d are not in fluid communication. Alternately, base 152 may be absent such that chambers 151a-151d are separate from each other.

Figure 19:
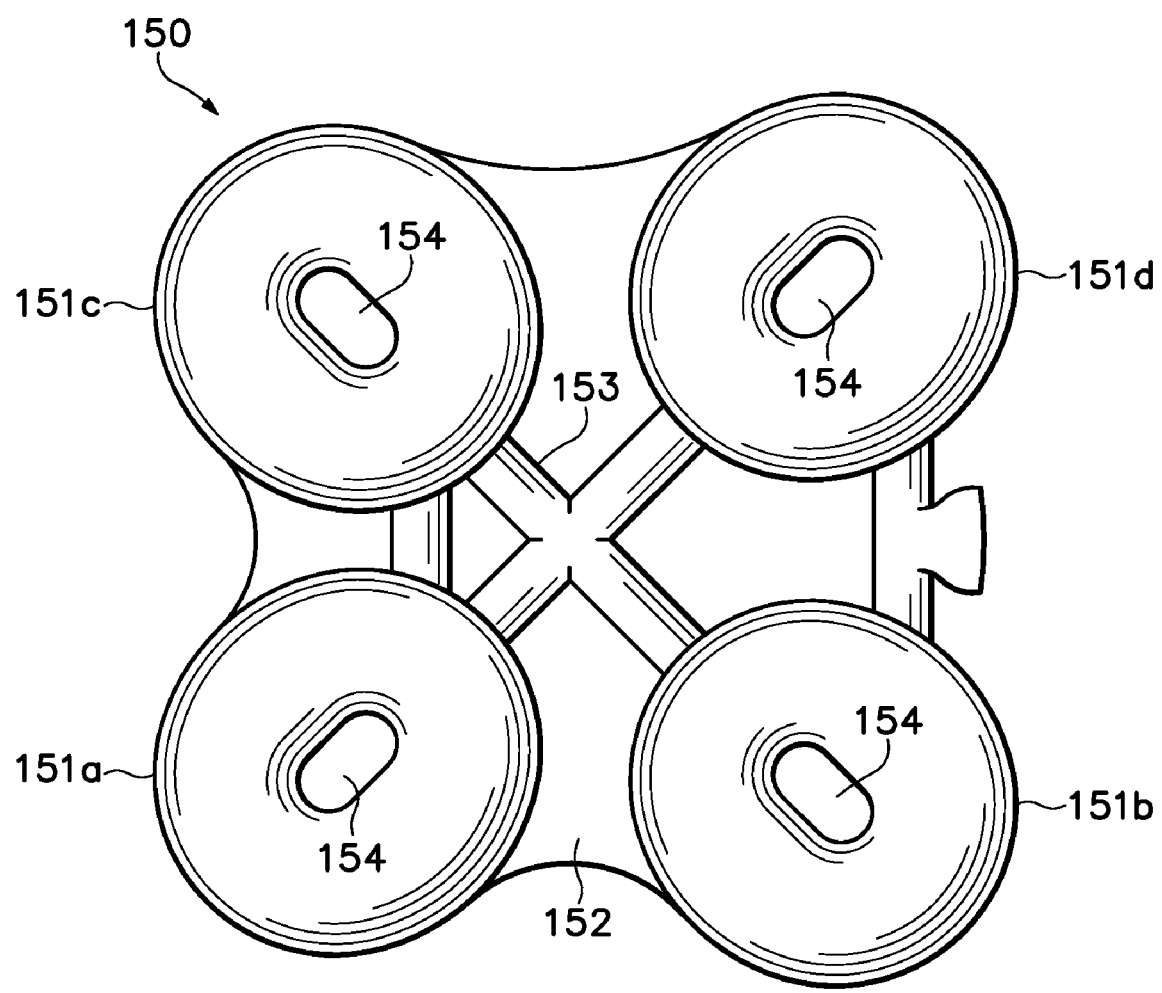
FIG. 19 is a top plan view of a support component of the article of footwear depicted in FIG. 13.
Figure 20:
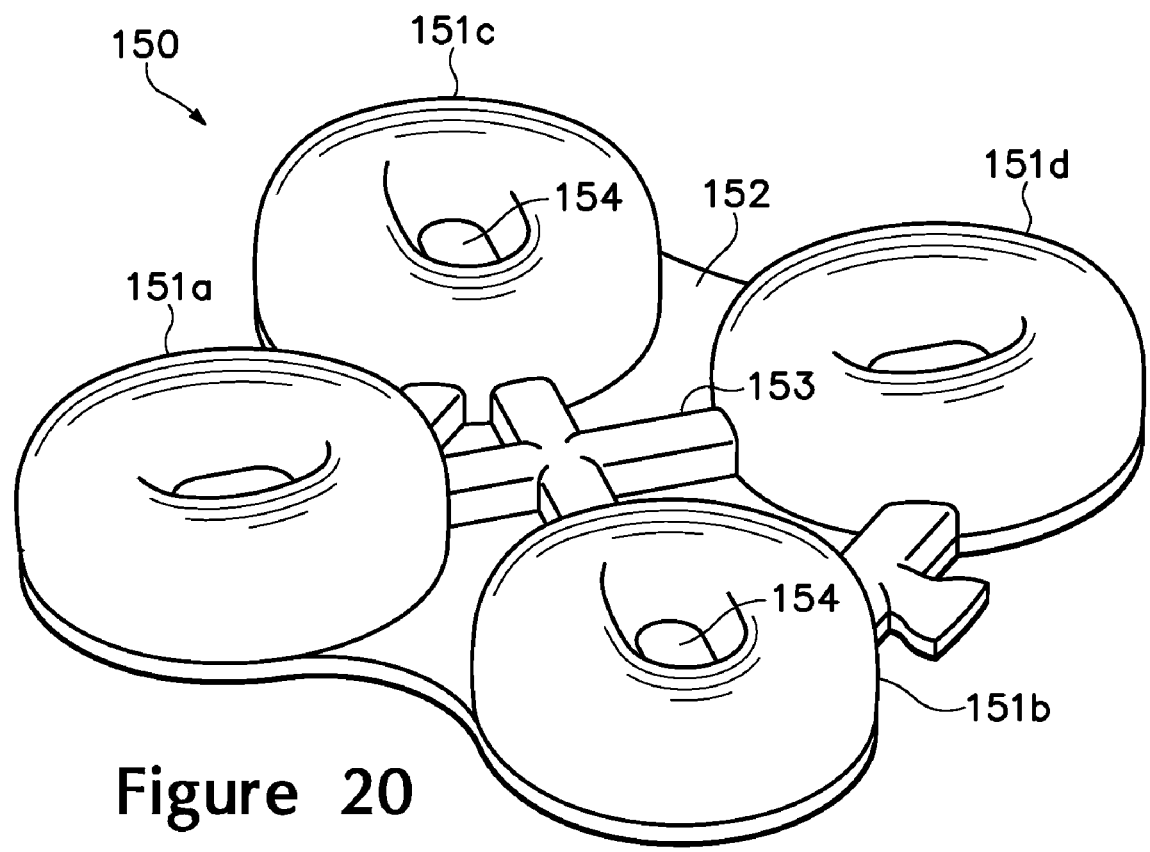
FIG. 20 is a perspective view of the support component.

Inserts 61 and 62 were discussed above as limiting the degree to which first surface 51 and second surface 52 protrude outward due to the pressure of the fluid within chamber 50. Similar inserts may be utilized with chambers 151a-151d. As depicted in FIGS. 19 and 20, however, each of chambers 151a-151d include an internal bond 154 that extends between opposite surfaces and limits the degree to which the opposite surfaces protrude outward. Accordingly, structures similar to inserts 61 and 62 may be absent from chambers 151a-151d. Each of chambers 151a-151d define various centrally-located indentations in areas corresponding with bond 154. Attachment members 141a-141d are each contoured to extend into the indentations.

As discussed above, attachment members 141a-141d may be formed from a clear or at least partially clear material. The polymer material forming chambers 151a-151d may also be clear or at least partially clear such that the optical properties of attachment members 141a-141d and chambers 151a-151d are similar. Together, attachment members 141a-141d and chambers 151a-151d form a portion of a thickness of sole structure 130. By forming attachment members 141a-141d from a material with similar optical properties as chambers 151a-151d, sole structure 130 has the appearance that chambers 151a-151d form a greater portion of the thickness of sole structure 130. That is, forming attachment members 141a-141d and chambers 151a-151d from a material with similar optical properties imparts the appearance that chambers 151a-151d extend from outsole 131 to upper portions of plate 140. In addition to forming attachment members 141a-141d and chambers 151a-151d from a clear material to impart optical similarity, attachment members 141a-141d and chambers 151a-151d may be formed from materials that are similarly colored, materials that have similar surface textures, materials with similar designs incorporated therein, or materials with any other properties that may impart similar appearances. Accordingly, attachment members 141a-141d and chambers 151a-151d may be formed from materials with a substantially identical color or transparency, for example, to impart optical similarity.

The above discussion focuses upon the structure of sole structure 130 in the heel region of footwear 100. A similar structure may also be utilized in the midfoot and forefoot regions. With reference to FIG. 13, sole structure 130 includes various elements that extend downward from upper 120 and each include an individual plate portion, chamber portion, and outsole portion. Whereas support component 150 includes four chambers 151a-151d, each of these elements include a single chamber. In some embodiments, the heel region of sole structure 130 may have a similar configuration wherein each of chambers 151a-151d are separate from each other.

The invention is disclosed above and in the accompanying drawings with reference to a variety of embodiments. The purpose served by the disclosure, however, is to provide an example of the various features and concepts related to aspects of the invention, not to limit the scope of aspects of the invention. One skilled in the relevant art will recognize that numerous variations and modifications may be made to the embodiments described above without departing from the scope of the invention, as defined by the appended claims.

That which is claimed is:

1. An article of footwear having an upper and a sole structure secured to the upper, the sole structure incorporating a support element comprising:

a sealed fluid-filled chamber formed of a polymer material and defining a first surface having an interior side in contact with the fluid within the chamber and an exterior side not contacting the fluid within the chamber, an opposite second surface having an interior side in contact with the fluid within the chamber and an exterior side not contacting the fluid within the chamber, and a sidewall extending between the first surface and the second surface;

a first insert secured to the exterior side of the first surface and at least partially recessed into the polymer material of the chamber; and a second insert secured to the exterior side of the second surface, wherein the sole structure defines a void positioned in a heel region of the article of footwear, and the support element and three additional support elements are located within the void and extend between upper and lower surfaces of the void.

2. The article of footwear recited in claim 1, wherein conduits place the support element and the three additional support elements in fluid communication.

3. The article of footwear recited in claim 1, wherein the second insert is at least partially recessed into the polymer material of the chamber.

4. The article of footwear recited in claim 1, wherein the chamber is devoid of internal connections that join the first surface and the second surface.

5. The article of footwear recited in claim 1, wherein the chamber has a cylindrical configuration.

6. The article of footwear recited in claim 1, wherein the chamber is pressurized and sealed.

7. The article of footwear recited in claim 1, wherein the chamber is pressurized to deform at least one of the first insert and the second insert.

8. The article of footwear recited in claim 1, wherein the chamber is pressurized to place an outward force upon the first surface and deform the first insert to decrease a curvature of the first insert.

9. The article of footwear recited in claim 1, wherein the first insert has a configuration of a plate.

10. An article of footwear having an upper and a sole structure secured to the upper, the sole structure comprising:

a midsole that defines a void positioned in a heel region of the footwear and extending through a medial side and a lateral side of the footwear, the void having an upper surface and an opposite lower surface; and at least four support elements located within the void and extending between the upper surface and the lower surface, at least one of the support elements including: (a) a fluid-filled chamber formed of a polymer material and having a first surface having an interior side in contact with the fluid within the chamber and an exterior side not in contact with the fluid within the chamber, an opposite second surface having an interior side in contact with the fluid within the chamber and an exterior side not in contact with the fluid within the chamber, and a sidewall extending between the first surface and the second surface, the chamber being devoid of internal connections that join the first surface and the second surface, and (a) a first insert and a second insert, the first insert being secured to the exterior side of the first surface and at least partially recessed into the polymer material, and the second insert being secured to the exterior side of the second surface, wherein the first insert has an unflexed configuration and a flexed configuration, the first insert having a first degree of curvature in the unflexed configuration, and the first insert having a second degree of curvature in the flexed configuration, the first degree of curvature being greater than the second degree of curvature, and the chamber being pressurized such that an outward force upon the first surface deforms the first insert from the unflexed configuration to the flexed configuration.

11. The article of footwear recited in claim 10, wherein conduits place the four support elements in fluid communication.

12. The article of footwear recited in claim 10, wherein the second insert is at least partially recessed into the polymer material of the chamber.

13. The article of footwear recited in claim 10, wherein the chamber has a cylindrical configuration.

14. The article of footwear recited in claim 10, wherein the first insert has a configuration of a plate.

15. The article of footwear recited in claim 10, wherein a pair of plates form the upper surface and the lower surface of the void, the first insert and the second insert being secured to the plates.

* * * * *

UNITED STATES PATENT AND TRADEMARK OFFICE
CERTIFICATE OF CORRECTION

PATENT NO. : 7,774,955 B2  
APPLICATION NO. : 12/425437  
DATED : August 17, 2010  
INVENTOR(S) : Goodwin et al.

It is certified that error appears in the above-identified patent and that said Letters Patent is hereby corrected as shown below:

On the title page, item [56] on page 3 in References Cited, U.S. Patent Documents:
Please replace "4,905,382 3/1990 Yung-Mao" with -- 4,905,382 3/1990 Lin --.

On page 3 in References Cited, U.S. Patent Documents:
Please include reference -- 4,974,345 12/1990 Yung-Mao --.

On page 4 in References Cited, Foreign Patent Documents:
Please replace "EP 0605482 9/1992" with -- EP 0605485 9/1992 --.

Signed and Sealed this  
Twenty-eighth Day of December, 2010

David J. Kappos  
*Director of the United States Patent and Trademark Office*